United States Patent

Kurihara

[11] Patent Number: 6,069,956
[45] Date of Patent: May 30, 2000

[54] METHOD AND APPARATUS FOR ENCRYPTING MULTIPLEXED DATA STREAMS USING KEY INFORMATION CONTINUED IN STREAMS

[75] Inventor: Hiroshi Kurihara, Yokohama, Japan

[73] Assignee: Hitachi, Ltd, Tokyo, Japan

[21] Appl. No.: 08/763,990

[22] Filed: Dec. 12, 1996

[30] Foreign Application Priority Data

Dec. 15, 1995 [JP] Japan .................................. 7-326810

[51] Int. Cl.⁷ ...................................................... H04L 9/08
[52] U.S. Cl. ............................. 380/212; 380/37; 380/239
[58] Field of Search ................................. 380/10, 20, 43, 380/49, 37, 212, 239; 370/485, 486, 487, 488, 489; 348/5.5, 6.7, 12, 13; 455/3.1, 5.1, 6.1, 4.2

[56] References Cited

U.S. PATENT DOCUMENTS

| | | | |
|---|---|---|---|
| 4,710,921 | 12/1987 | Ishidoh | 370/110.1 |
| 5,365,272 | 11/1994 | Siracusa | 348/426 |
| 5,506,903 | 4/1996 | Yamashita | 380/19 |

FOREIGN PATENT DOCUMENTS

| | | |
|---|---|---|
| 0 162 461 | 11/1985 | European Pat. Off. . |
| 0 582 122 | 2/1994 | European Pat. Off. . |
| 1-246979 | 10/1989 | Japan . |
| 3-239033 | 10/1991 | Japan . |

OTHER PUBLICATIONS

ISO/IEC 11172–1 (see Specification p. 10).
ISO/IEC 13818–1 (see Specification p. 10).

*Primary Examiner*—Gail O. Hayes
*Assistant Examiner*—Christopher M. Tucker
*Attorney, Agent, or Firm*—Kenyon & Kenyon

[57] ABSTRACT

In a communication network in which data for transmission to a receiver terminal is multiplexed on a time-division basis and scrambled, a communication control apparatus and method for allowing the data to be descrambled at the receiver without fail. A scrambler of the sender apparatus includes a time-division frame monitoring circuit for receiving an unscrambled data stream generated by multiplexing time-division frames for application data and relevant information for transmission to thereby extract information concerning a scramble key, a scramble key manager for managing information concerning the scramble keys, an application data encryption processor for acquiring a scramble key corresponding to the information concerning the scramble key as received from the time-division frame monitoring circuit to thereby scramble the desired time-division frames of the data for transmission by using the scramble key as acquired.

12 Claims, 18 Drawing Sheets

FIG. 14

| OTHER ECMs | C1 | A1 Odd | ECM n+1 VALID | C1 | ECM n+1 IN-VALID | ECM ECM n VALID | A1 Even | B1 | A1' Even | ECM n VALID | ... | B1 | A1' Odd | A1 Odd | ECM n-1 VALID | ECM n IN-VALID |

44 ↗ (A1' Even)
43 42 ↗ (A1' Odd, A1 Odd)

METHOD AND APPARATUS FOR ENCRYPTING MULTIPLEXED DATA STREAMS USING KEY INFORMATION CONTINUED IN STREAMS

BACKGROUND OF THE INVENTION

The present invention relates generally to a communication apparatus and a communication method for broadcasting systems or communication systems for receiving application data signals such as audio, video, data and the like signals for transmission to receiver terminals. In particular, the invention is concerned with communication control apparatus and method for such system in which concealment of data communication is required. More particularly, the present invention is directed to personal computer communication system, video distribution system for personal computers, cable television (CATV) system, terrestrial broadcasting system, satellite broadcast system, satellite communication system and the like, and is concerned with a communication apparatus and a communication method therefor which are capable of establishing synchronism without fail between changeover of scramble keys used for encrypting or scrambling the data for transmission (hereinafter also referred to as application data) in order to secure concealment of such data and multiplexing thereof with time-division frames which contains information of the scramble keys.

Heretofore, as the method for switching or changing the scramble keys and time-division frames for ECM data (abbreviation of Entitlement Control Message data), there has been known a method mentioned below.

A multiplexer or multiplexing unit for multiplexing application data such as audio and/or video data as well as data in intrinsic sense is provided with an input port dedicated for the ECM data in addition to those for the application data mentioned above. In that case, the ECM data is imparted with higher level of priority for multiplexing than the application data inputted by way of the other input ports. The multiplexing unit is so designed as to operate such that the time taken for the multiplex processing of the data inputted through respective input ports can remain constant. Alternatively, a maximum time taken for the processing by the multiplexer as a whole is set as a preset multiplexing time. Upon every lapse of constant or preset time interval, the scramble key is switched or changed over. The scramble key as changed is then contained in the ECM data and inputted to the multiplexing unit to be thereby multiplexed and transferred to a scrambler, which responds thereto by scrambling the application data with the scramble key as received. In the conventional communication apparatus known heretofore, synchronism is established between the switching or changeover of the scramble key and that of the ECM data in the manner described above.

As is apparent from the above, the timing for multiplexing the ECM data into a data stream is determined by the multiplexing unit. Additionally, the timing for changing the scramble key is effected at a predetermined constant time interval within the scrambler. Under the circumstances, there may arise such situation that if the processing has not been completed within the predetermined processing time preset in the multiplexer for some reason, the ECM data containing the information of old scramble key, so to say, will be outputted from the multiplexing unit to be transmitted as the valid ECM data. In that case, it becomes impossible to restore the application data from the scrambled state, i.e., to descramble the application data at the side of the receiver apparatus. Obviously, influence of such event will propagate through the whole system, giving rise to a serious problem that the service is interrupted temporarily at the side of the subscribers or receivers.

Besides, when the conventional scramble key change procedure is adopted, it is impossible to manufacture the units such as the multiplexer and the scrambler in the specifications independent of each other. For this reason, when a transmission line or channel which need not ensure concealment of data for transmission is newly imposed with requirement for the concealment, then a multiplexer of other specifications will be required, to a disadvantage. Needless to say, such multiplexing unit will be expensive because of higher performance and rigor specifications as demanded.

SUMMARY OF THE INVENTION

In the light of the state of the art, it is an object of the present invention to provide communication apparatus and a communication method which can establish synchronism positively without fail between switching or changeover of scramble keys and that of scramble key information contained in data stream.

Another object of the invention is to realize a communication system which can enjoy high flexibility by making it possible to provide the equipment of a sender station with a scrambling unit and a multiplexing unit independent of each other, to thereby allow even an existing transmission line imposed with no requirement concerning concealment of data to be newly retrofitted with facility for concealment without difficulty.

In view of the above and other objects which will become apparent as the description proceeds, it is proposed according to the teachings of the present invention that instead of establishing synchronism between the scrambling of application data and the information concerning the scramble key as contained in the data stream for transmission by making constant the processing time taken by the multiplexing unit as in the case of the control apparatus known heretofore, facility is provided for detecting changeover of scramble key information contained in a data stream generated after multiplexing, to thereby scramble the application data by using a scramble key which corresponds to the detected scramble key information.

Thus, according to an aspect of the present invention, there are provided a communication apparatus and a communication method in which changeover or change of the scramble key is detected on the basis of a version number (indicating a sequence in which the scramble key is changed for updating thereof) and an information indicator (indicating whether ECM data for transmission is valid or not) both contained in the ECM data of the data stream generated after the multiplexing.

In a preferred mode for carrying out the invention, the communication apparatus may be arranged such that a time-division frame for ECM data is inserted into an application data and data multiplexed on a time-division basis to be thereby outputted as one unscrambled data stream. To this end, the communication apparatus may include a scrambler unit for receiving the unscrambled data stream, monitoring individual time-division frames and detecting information concerning the scramble keys contained in the unscrambled data stream to thereby scramble the application data by using scramble keys corresponding to the detected information and a scramble key changeover control unit having an external input interface for generating the ECM data by changing the scramble key information on the basis of information supplied externally by way of the input interface to thereby send the ECM data to the multiplexing unit.

In another preferred mode for implementing the control apparatus according to the present invention, attribute identifying information of the scramble keys contained in the time-division frames for the application data carried in the form of a data stream after multiplexing is used as the information for detecting changeover of the scramble keys. To this end, the communication apparatus may include a timer imparted with attribute identifying information adding function which is provided with an external input interface to manage the time interval at which the scramble key is changed for updating thereof in accordance with the information supplied externally by way of the input interface other than the scrambler unit and scramble key changeover control unit. In some cases, the timing for updating or changing the scramble key may differ from one to another application data. Further, the timer imparted with the attribute identifying information adding function serves for the function for inserting the attribute identifying information into the time-division frame for the application data contained in the unscrambled data stream outputted from the multiplexing unit. The data stream outputted from the timer imparted with attribute identifying information adding function is inputted to the scrambler unit, which responds thereto by detecting the information conceding the scramble key contained in the time-division frame carried by the data stream, whereby the time-division frames of the application data are scrambled with the scramble key corresponding to the detected information.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

Preferred embodiment of the present invention will now be described in conjunction with the accompanying drawings, in which:

FIG. 14 is a view for illustrating an exemplary structure of an unscrambled data stream inputted to a scrambler according to a second embodiment of the present invention;

DESCRIPTION OF THE PREFERRED EMBODIMENTS

Now, the present invention will be described in detail in conjunction with what is presently considered as preferred or typical embodiments thereof by reference to the drawings.

Embodiment 1

A first embodiment of the present invention is directed to detection of switching or changeover of scramble keys on the basis of information concerning a version number and an information indicator contained in time-division frames (also referred to as packet) of ECM data carried in the form of a multiplexed data stream. As the multiplexed data stream, there may be mentioned, for example, those specified in "MPEG-1 SYSTEMS (ISO/IEC 11172-1)" and "MPEG-2 SYSTEMS (ISO/IEC 13828-1)". The scramble key corresponds to the session key used, for example, in a fee-charging scrambled broadcasting network. Further, the time-division frame, time-division frame identifier or ID, version number, information indicator and scramble key attribute identifying information correspond to transport stream packet (or TSP in abridgement), packet identifier (PID in abridgement), version number such as program specific information (PSI in abridgement) and the like, current/next identifier such as PSI and the like, and transport control flag, respectively, which are set forth in "MPEG-2 SYSTEMS". The version number represents the values imparted to the scramble keys in the updating or renewing sequence thereof. The information indicator represents a value contained in the ECM data for indicating whether or not the associated ECM data is valid or invalid.

Figure 1:
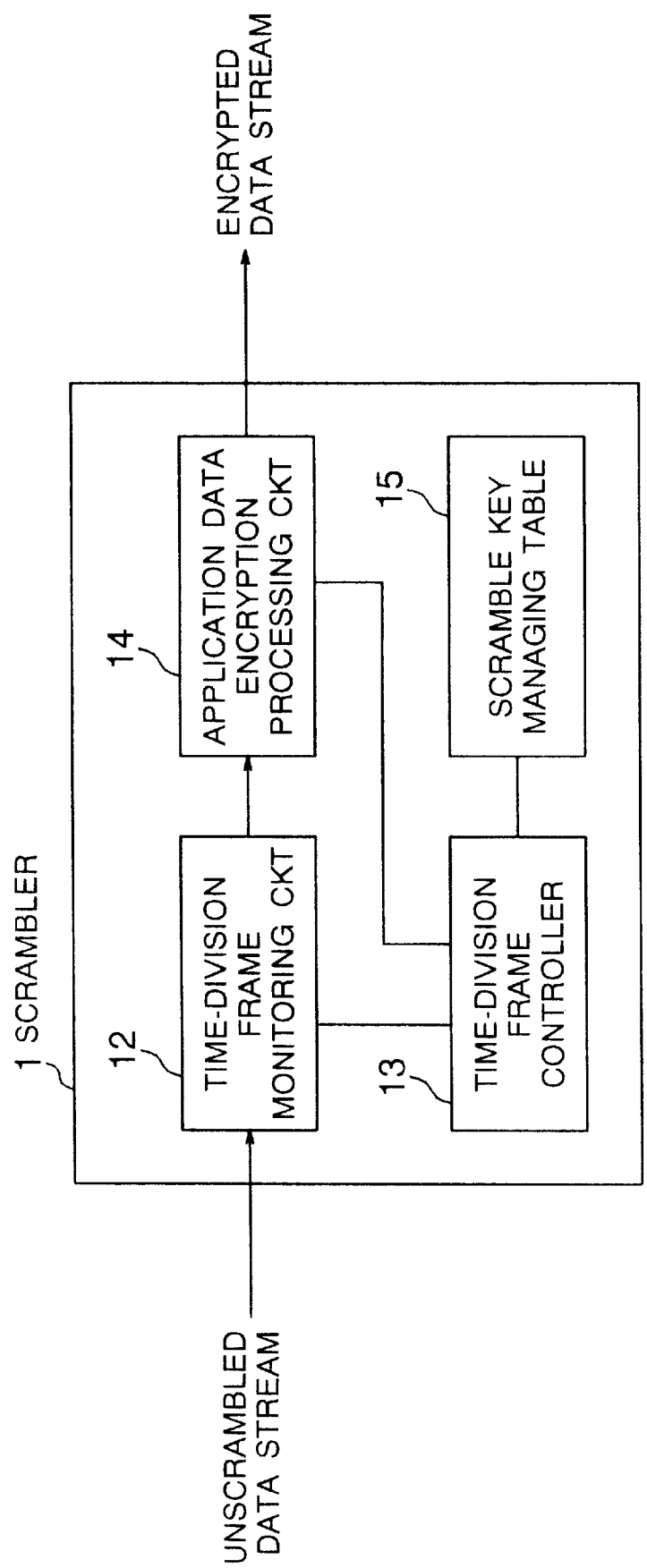
FIG. 1 is a block diagram showing a general arrangement of a scrambler according to the present invention.

FIG. 1 is a block diagram showing a general arrangement of a scrambler which is imparted with scramble key changeover detecting capability according to the first embodiment of the present invention. In the figure, reference number 1 designates generally the scrambler, 12 denotes a time-division frame monitoring circuit, 13 denotes a time-division frame controller, 14 denotes an application data encryption processing circuit and numeral 15 denotes a scramble key managing table.

The input signal to the scrambler 1 is an unscrambled data stream which corresponds to data stream generated by a multiplexing on a time-division basis the application data such as video, audio or the like data and inserting additionally time-division frames for ECM data.

The unscrambled data streams inputted to the scrambler 1 are then supplied to the time-division frame monitoring circuit 12 sequentially in the order in which the unscrambled data streams are inputted. The time-division frame monitoring circuit 12 is so designed as to monitor or detect the individual time-division frames contained in the unscrambled data streams for thereby identifying the time-division frames for the ECM data, whereupon the version number and the information indicator contained in the ECM data as identified are acquired. The version number and the information indicator as acquired are transferred to the time-division frame controller 13 together with the time-division frame ID of the relevant ECM data. In the time-division frame controller 13, the version number received from the time-division frame monitoring circuit 12 is compared with the version number received precedently, i.e., at a preceding time or the last time. When it is detected as a result of the comparison that the version number varies in succession and that the information indicator is valid, then decision is made that the scramble key is changed and updated. In that case, the time-division frame controller 13 acquires the scramble key corresponding to the version number detected currently, the attribute identifying information of the scramble key and the time-division frame ID for the application data to be scrambled from the scramble key managing table 15 on the basis of the time-division frame ID of the ECM data and the version number received from the time-division frame monitoring circuit 12. The information as acquired is then transformed to the application data encryption processing circuit 14. In the application data encryption processing circuit 14, the time-division frames for the application data concerned are scrambled by using the scramble key received from the scramble key managing table 15 via the time-division frame controller 13. Additionally, in the application data encryption processing circuit 14, the attribute identifying information of the scramble key as received from the time-division frame controller 13 is written into the time-division frames for the application data, whereupon the output of the application data encryption processing circuit 14 is generated as the scrambled or encrypted data stream from the scrambler 1. On the other hand, as to the time-division frames for the application data which are not to be scrambled and which are also supplied via the time-division frame monitoring circuit 12, the time-division frame controller 13 decides that the scrambling is not to be performed, whereupon the corresponding data is allowed to pass through the application data encryption processing circuit 14 without being scrambled.

Figure 2:
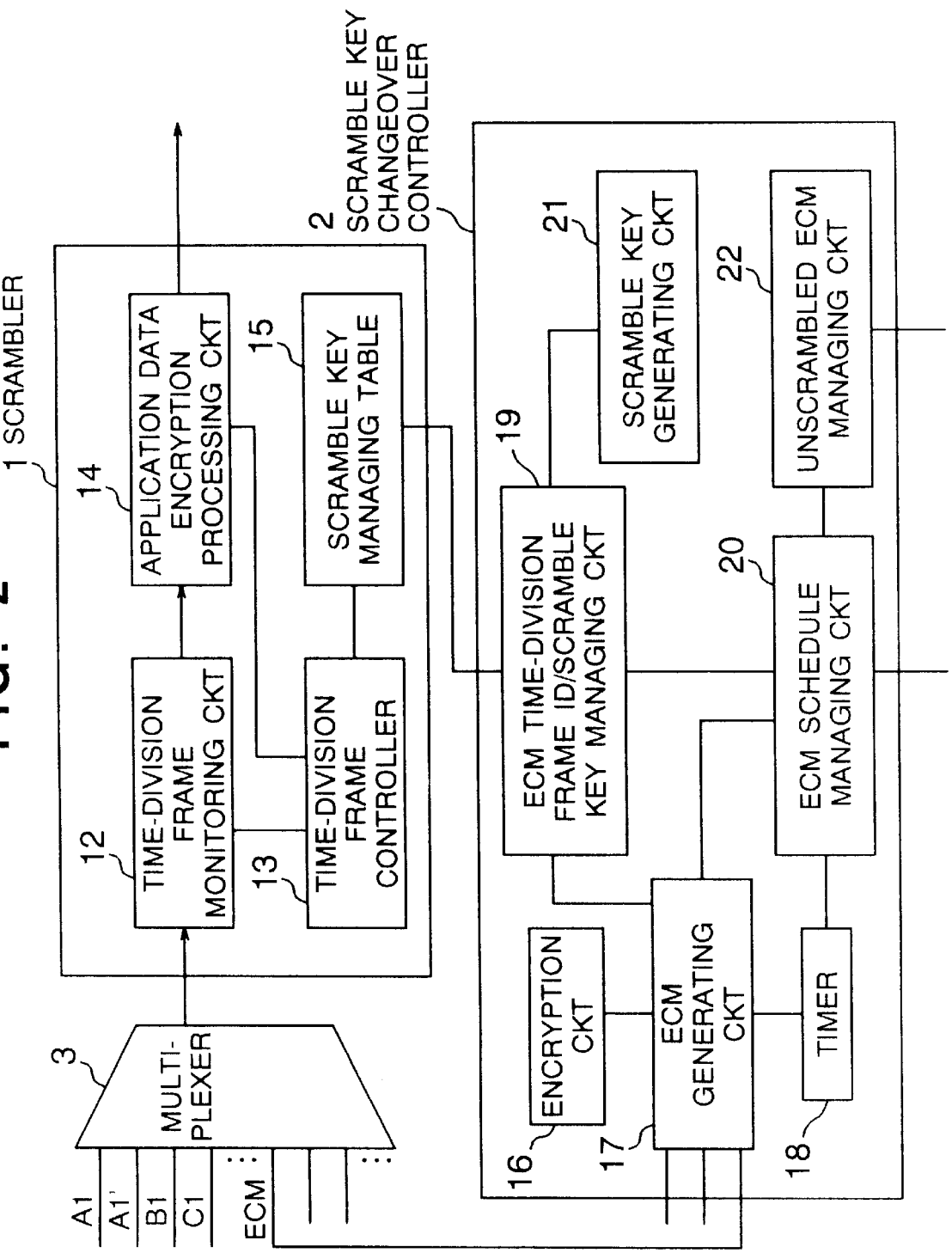
FIG. 2 is a schematic circuit diagram showing a configuration of a major portion of sender equipment provided at a sender side in a communication system according to an exemplary embodiment of the present invention.

FIG. 2 is a schematic circuit diagram showing a configuration of a major portion of sender equipment or apparatus provided at the sender side, which apparatus includes the scrambler described above by reference to FIG. 1. In FIG. 2, reference numeral 1 denotes the scrambler shown in FIG. 1, numeral 2 denotes a scramble key changeover controller, and numeral 3 denotes a multiplexer, wherein the scrambler 1 is comprised of the time-division frame monitoring circuit 12, the time-division frame controller 13, the application data encryption processing circuit 14 and the scramble key managing table 15. On the other hand, the scramble key changeover controller 2 is comprised of an encryption (or encipher) circuit 16, an ECM generating circuit 17, a timer 18, an ECM time-division frame ID/scramble key managing circuit 19, an ECM schedule managing circuit 20, a scramble key generating circuit 21 and an unscrambled ECM managing circuit 22.

In the scramble key changeover controller 2 shown in FIG. 2, the ECM schedule managing circuit 20 is provided with an external input interface through which the time-division frame IDs of the ECM data and the time-division frame IDs of the individual application data are inputted externally. The ECM schedule managing circuit 20 is designed to manage the time-division frame IDs of the ECM data and the time-division frame IDs of the individual application data by establishing correspondences therebetween while transferring the relevant information to the ECM generating circuit 17, the ECM time-division frame ID/scramble key managing circuit 19 and the unscrambled ECM managing circuit 22, respectively. Additionally, the information concerning the interval at which the scramble key is to be updated or renewed for thereby scrambling the application data is externally inputted to the ECM schedule managing circuit 20. The information concerning the scramble key updating interval as inputted is transferred to the timer 18 together with the corresponding time-division frame IDs of the ECM data. The unscrambled ECM managing circuit 22 is also provided with an external input interface through which the unscrambled ECM managing circuit 22 receives ECM syntaxes from an external source, wherein a ECM syntaxes are managed with correspondences being established to the time-division frame IDs for the relevant ECM data supplied from the ECM schedule managing circuit 20. On the other hand, in the scramble key generating circuit 21, the scramble keys corresponding to a number of times the scramble key are to be changed for updating are generated for each of the time-division frame IDs of the ECM data, whereon the scramble keys as generated are transferred to the ECM time-division frame ID/scramble key managing circuit 19. In the ECM time-division frame ID/scramble key managing circuit 19, the scramble keys as received are imparted with the scramble key attribute identifying information. More specifically, the scramble key attribute identifying information may be imparted alternately in the sequence of "Even", "Odd", "Even", "Odd" or alternately "Odd", "Even", "Odd", "Even" in the order in which the scramble keys are to be changed for updating or renewal thereof. Such scramble key attribute identifying information is required for validating the operation of the communication system for various services. Besides, each of the scramble keys is allocated with the version number indicating its position in the sequence in which the scramble key is changed for the updating purpose. The information concerning the scramble keys is managed together with the time-division frame IDs of the application data for every time-division frame ID of the ECM data. On the other hand, the ECM time-division frame ID/scramble key managing circuit 19 transfers the information mentioned above to the scramble key managing table 15 before the scramble key is validated for the application data. The ECM generating circuit 17 serves to generate the ECM data on the basis of the information managed by the ECM time-division frame ID/scramble key managing circuit 19. Of the information managed by the ECM time-division frame ID/scramble key managing circuit 19, the information concerning the scramble key undergoes encryption processing which is executed by the encryption circuit 16. The information concerning the scramble key is changed over in conformance with the scramble key updating interval managed by the timer 18. The ECM data generated in this way is sent to the multiplexer 3 from the ECM generating circuit 17.

In the multiplexer 3, more than one application data such as audio, video and the like data are multiplexed on a time-division basis, as indicated by data A1, data A1', data B1 and data C1. Additionally, the time-division frames for the ECM data of the ECM data supplied from the scramble key changeover controller 2 are multiplexed similarly. As a result of these multiplexings, the unscrambled data stream is outputted from the multiplexer 3 to be transferred to the scrambler 1.

Operations of the individual components constituting the scrambler 1 have been briefly described by reference to FIG. 1. In the following, operation of the scrambler will be described in conjunction with exemplary or illustrative structures of the time-division frame and the multiplexed data stream.

Figure 10:
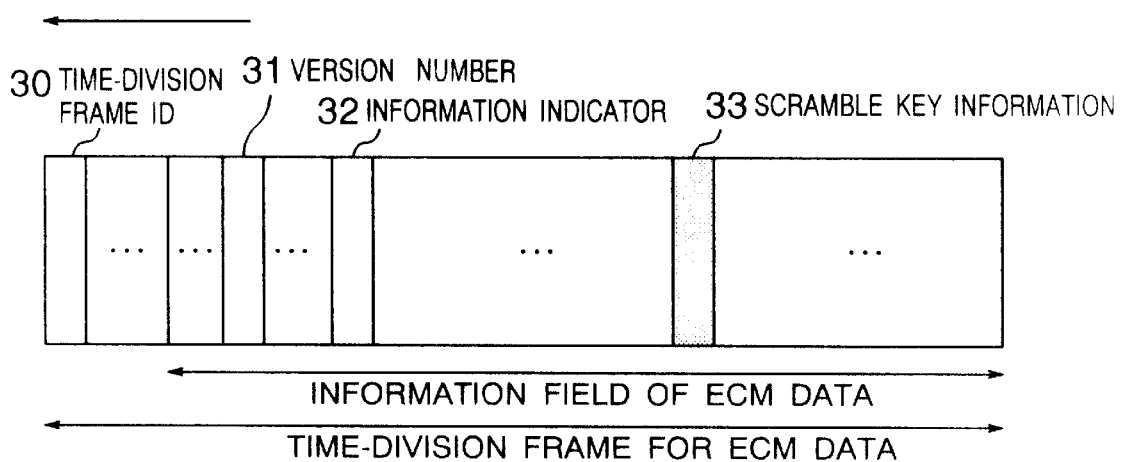
FIG. 10 is a view illustrating an exemplary structure of a time-division frame for ECM data.
Figure 11:
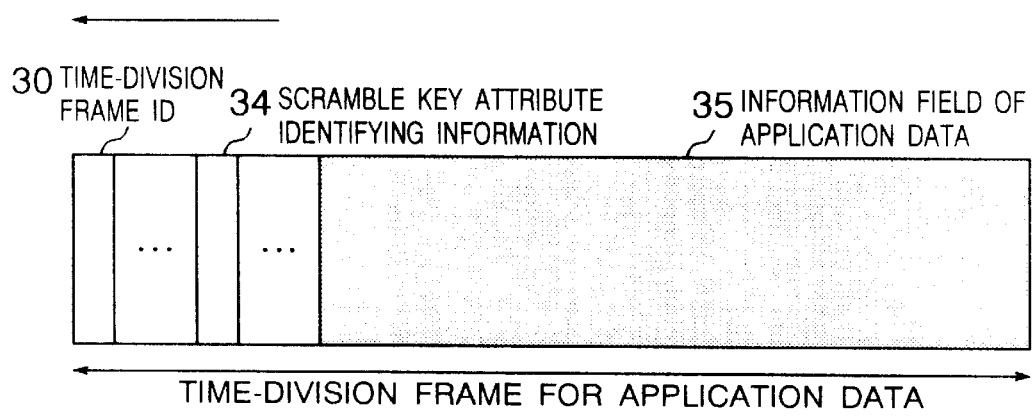
FIG. 11 is a view illustrating an exemplary structure of a time-division frame for application data.

FIG. 10 shows a structure of the time-division frame for the ECM data and FIG. 11 shows a structure of the time-division frame for the application data. In FIG. 10, reference numeral 30 designates the time-division frame ID, 31 designates the version number, 32 designates the information indicator and 33 designates the information of scramble key, all of which have been described previously. The scramble key information 33 indicated by a hatched field is enciphered or scrambled by the encryption circuit 16 constituting a part of the scramble key changeover controller 2. On the other hand, in FIG. 11, reference numeral 30 designates the time-division frame ID, 34 designates the attribute identifying information of the scramble key, and numeral 35 denotes an information field or area in which application data such as video, audio or the like data is stored. The hatched region 35 indicates the information which undergoes scrambling operation of the application data encryption processing circuit 14 which constitutes a part of the scrambler 1, as described previously. The time-division frame ID 30 is imparted to each of the application data. Assuming, by way of example, that four application data exist, then different time-division frame IDs are imparted to the four application data, respectively. Similarly, the time-division frame ID 30 of the ECM data is imparted discretely to each ECM data. For example, in the case where two ECM data (each corresponding to two application data) are present, the different time-division frame IDs are imparted to the two ECM data, respectively. In more concrete, in the case of the example illustrated in FIG. 2, the time-division frame IDs are allocated not only to the application data A1, A1', B1 and C1, respectively, on a one-by-one basis but also to the ECMs, respectively, which are supplied to the multiplexer 3 together with the application data mentioned above. As can be seen in FIG. 10, the time-division frame for the ECM data contains the version number 31 indicating the scramble key update changeover sequence, the information indicator 32 indicating whether the information of the ECM data time-division frame is valid or invalid, and the information 33 of the scramble key itself. The time-division frame for the application data further contains the attribute identifying information of the scramble key which will be demanded in some operation of the communication system, as is illustrated in FIG. 11.

Figure 12:
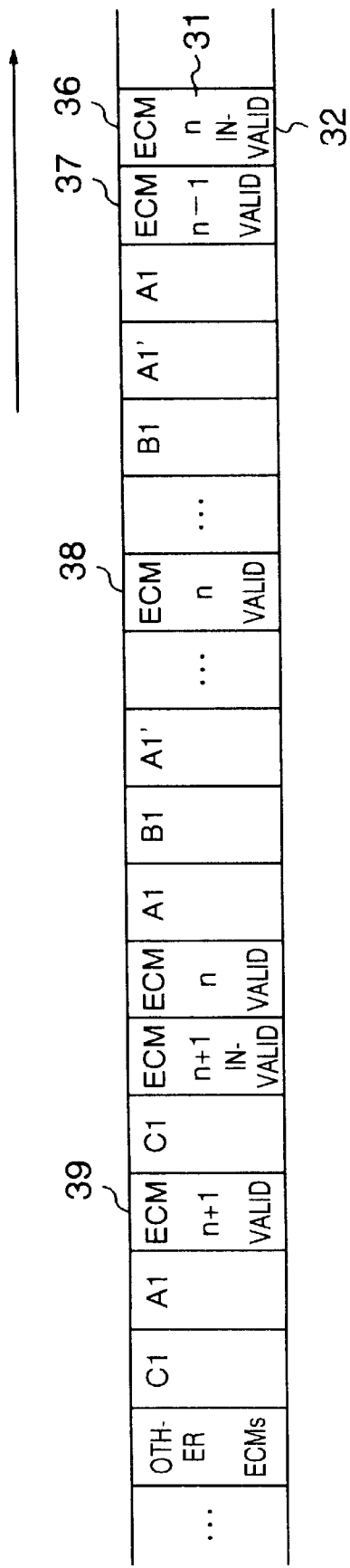
FIG. 12 is a view for illustrating an exemplary structure of an unscrambled data stream inputted to a scrambler according to a first embodiment of the present invention.
Figure 13:
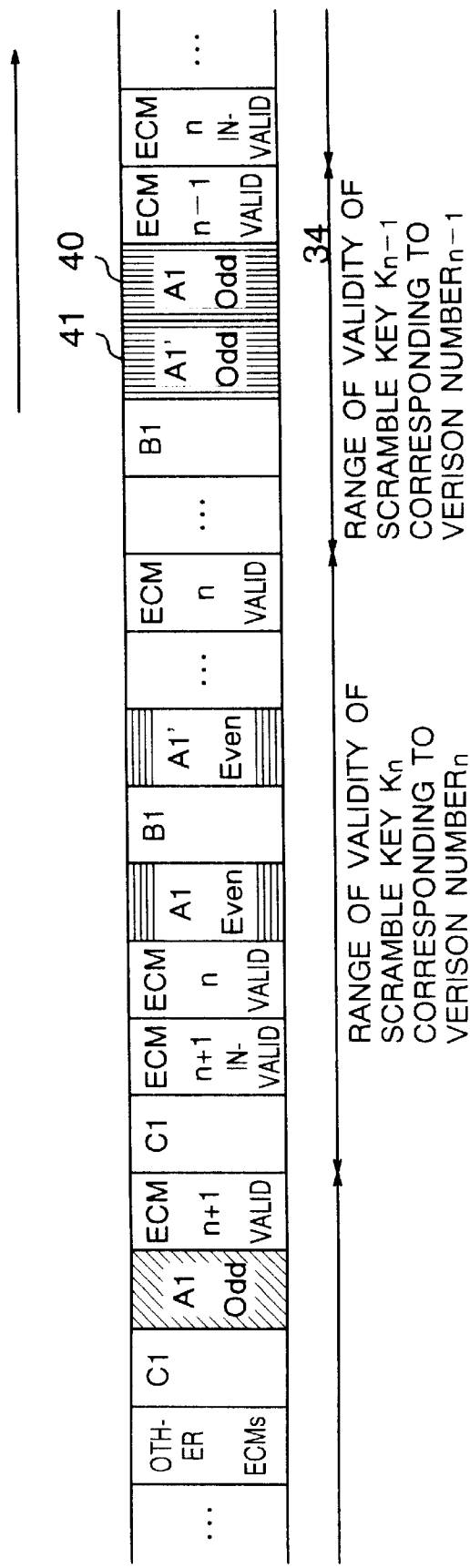
FIG. 13 is a view illustrating as exemplary structure of an encrypted data stream outputted from the scrambler according to the first embodiment of the present invention.

The scrambler 1 receives the unscrambled data stream composed of the time-division frames such as illustrated in FIGS. 10 and 11 and performs scrambling operation on the time-division frames of the application data, whereby the encrypted data stream is outputted from the scrambler 1. FIG. 12 is a view for illustrating a structure of the unscrambled data stream inputted to the scrambler 1, while FIG. 13 illustrates a structure of the encrypted data stream outputted from the scrambler 1. In FIG. 12, the time-division frames for the ECM data are designated by reference numerals 36, 37, 38 and 39, respectively. Further, in FIG. 13, reference numeral 31 designates the version number, 32 designates the information indicator, 34 designates the attribute identifying information of the scramble key, 40 designates the time-division frame for the application data A1, and numeral 41 designates the time-division frame for the application data A1'.

The unscrambled data stream shown in FIG. 12 is inputted to the scrambler 1 sequentially, starting from the rightmost time-division frame as viewed in the figure. In the scrambler 1, each time-division frame ID 30 is supervised or monitored by the time-division frame monitoring circuit 12, wherein the time-division frame for the relevant ECM data is detected on the basis of the time-division frame ID 30 and the version number 31 and the information indicator 32, which are derived from the time-division frame as detected. In the case of the illustrated example, the ECM data dedicated time-division frame 36 is detected at first. Subsequently, the time-division frame controller 13 decides on the basis of the information indicator 32 received from the time-division frame monitoring circuit 12 that the information carried by the ECM data dedicated time-division frame 36 is invalid and hence the scramble key is not changed. In succession, the time-division frame monitoring circuit 12 detects the time-division frame 37 for the ECM data. At this juncture, it is assumed that the version number 31 of the valid ECM data detected precedently was "n-2". In that case, because the information indicator of the time-division frame 37 for the ECM data indicates validity and because the version number 31 changes in continuation from "n-2" to "n-1", the time-division frame controller 13 decides that the scramble key is changed. Accordingly, the time-division frame controller 13 fetches the scramble key as well as the information concerning the scramble key from the scramble key managing table 15 on the basis of the version number.

Figure 16:
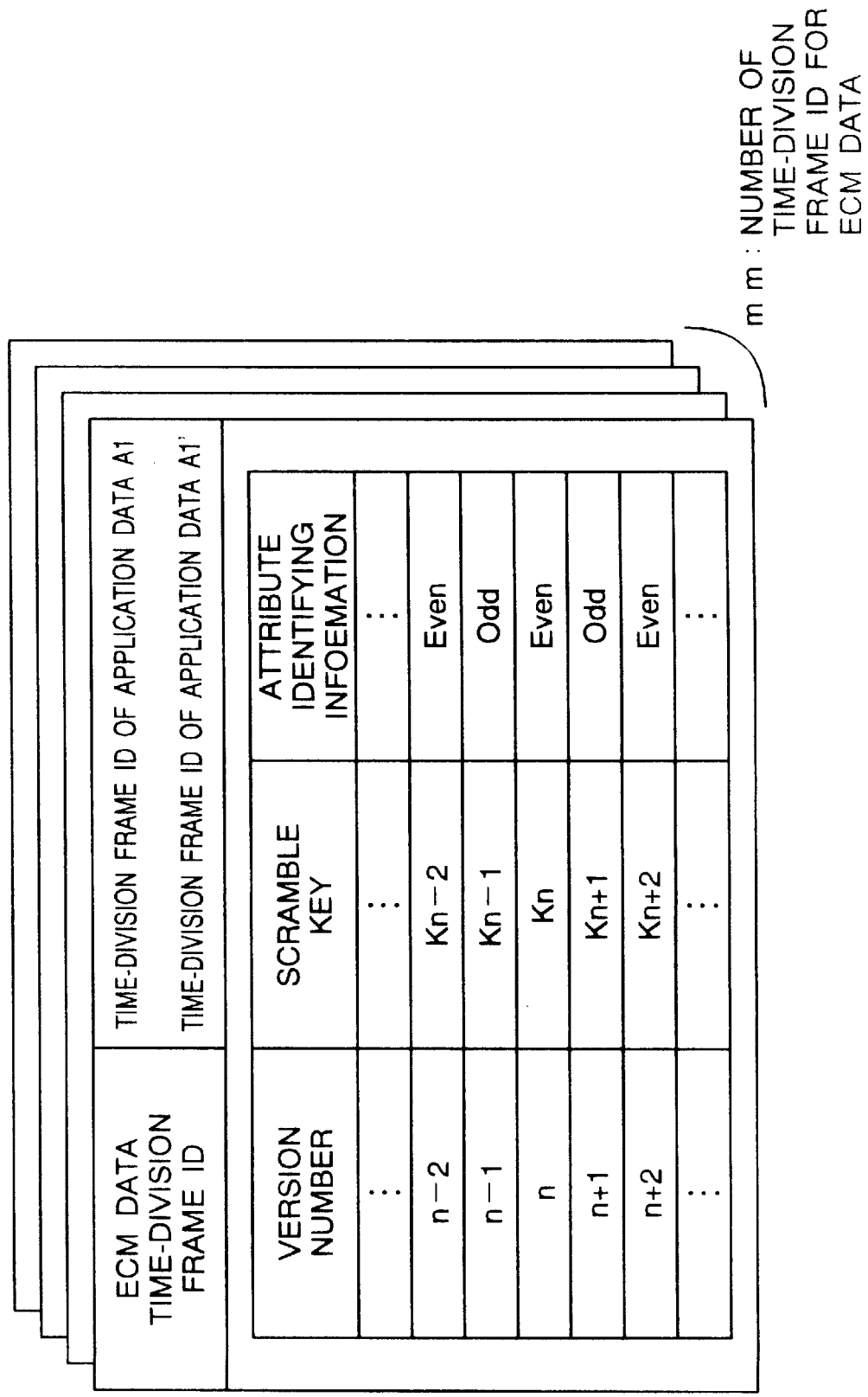
FIG. 16 is a view for illustrating imagearily a manner in which scramble key and information thereof are stored in a scramble key managing table according to the first embodiment of the invention.

FIG. 16 is a view for illustrating imagearily in what manner the scramble key information is stored in the scramble key managing table 15. Referring to the figure, the scramble key managing table 15 manages for each of the time-division frame ID of the ECM data the time-division frame ID, for the application data to be subject to the scrambling, the scramble key, the version number and the attribute identifying information of the scramble key while establishing correspondences thereamong. The time-division frame controller 25 acquires the IDs of the application data "A1" and "A1'" to be scrambled, the scramble key "Kn-1" and the attribute identifying information "Odd" for the scramble key from the scramble key managing table 15 on the basis of time-division frame ID of the ECM data and the version number "n-1". The information mentioned above is then transferred to the application data encryption processing circuit 14, which responds thereto for thereby scrambling the time-division frames for the application data "A1" and "A1'" by using the scramble key "Kn-1" while writing the attribute identifying information "Odd" of the scramble key in the time-division frames for the application data "A1" and "A1'", respectively.

In the encrypted data stream shown in FIG. 13, the scrambled application data "A1" and "A1'" are represented by hatched areas 40 and 41, respectively. Further, the attribute identifying information of the scramble key written in the time-division frame for the application data by the application data encryption processing circuit 14 is shown, being designated by reference numeral 34. The processing described above is equally performed onto the time-division frame 38 for the ECM data shown in FIG. 12. More specifically, the scrambler 1 detects the time-division frame 38 for the ECM data to thereby scramble the application data "A1" and "A1'" with the scramble key "Kn" changed over from "Kn-1". Additionally, the attribute identifying information "Even" of the scramble key is written in a given area or field of the time-division frame for the application data concerned. Hereafter, detection of the time-division frame 39 for the ECM data, scrambling of changed scramble key and the writing of the attribute identifying information are carried out in similar manner. As a result of this, there can be generated the encrypted data stream of the structure such as illustrated in FIG. 13, in which the time-division frames for the application data follow the time-division frames 37, 38, 39 for the ECM data, respectively, wherein the time-division frame for ECM data are scrambled by using the information of the scramble keys contained in the corresponding ECM data time-division frames.

Embodiment 2

Next, description will be directed to a communication apparatus according to a second embodiment of the present invention. With the teachings of the invention incarnated in the instant embodiment, it is contemplated to detect the changeover of the scramble keys on the basis of the attribute identifying information of the scramble keys which is contained in the time-division frames for the application data.

Figure 3:
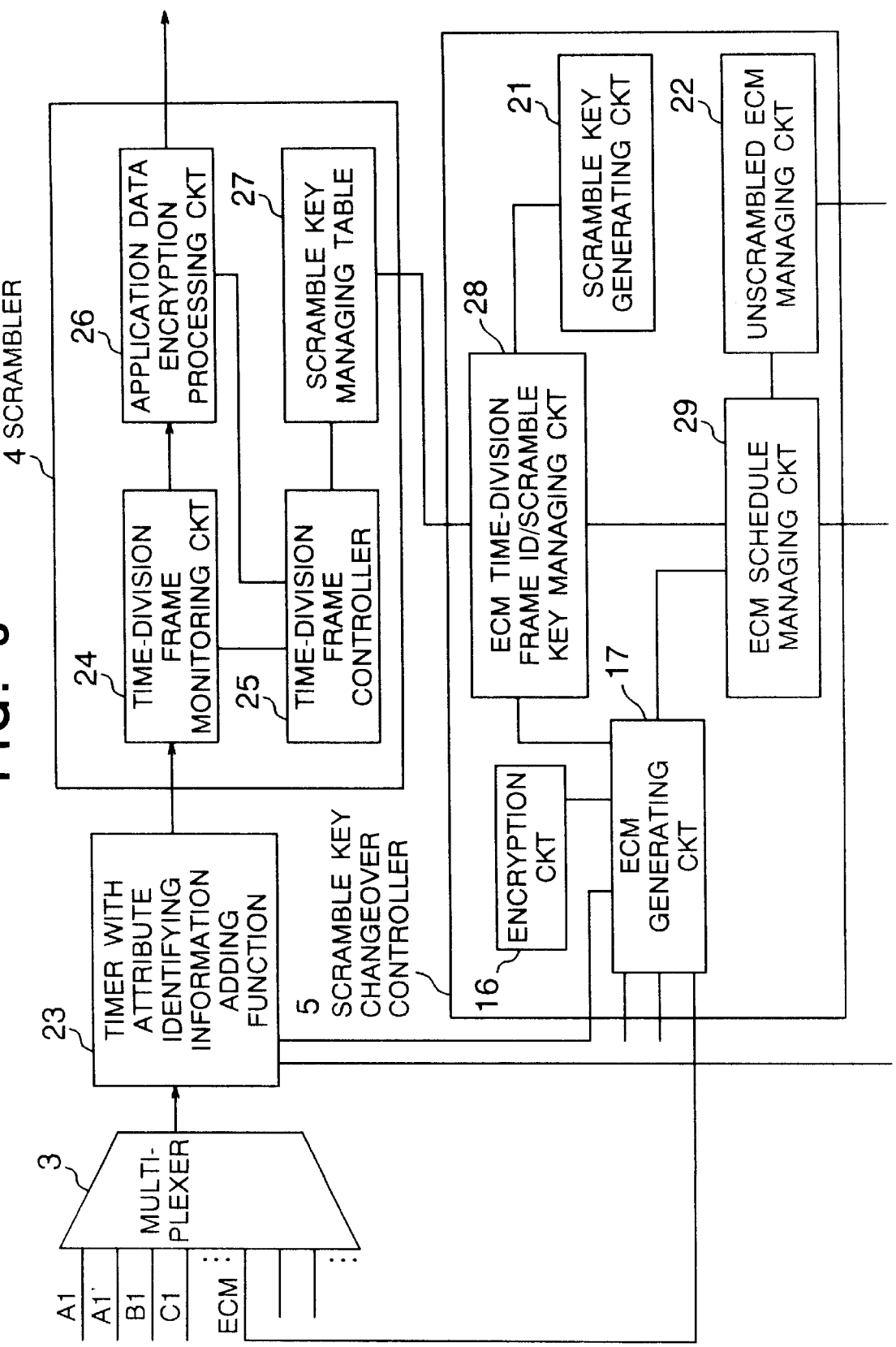
FIG. 3 is a schematic circuit diagram showing a configuration of a major portion of sender equipment provided at a sender side in a communication system according to another embodiment of the present invention.

FIG. 3 is a block diagram showing a circuit configuration of equipment installed at the sender side in a communication system. The configuration shown in FIG. 3 differs from that described hereinbefore in conjunction with the first embodiment of the invention by reference to FIG. 2 in the respects that the timer 18 incorporated in the key changeover controller shown in FIG. 2 is disposed at a downstream side of the multiplexer 3 and that the timer is imparted with a function for adding the attribute identifying information. In FIG. 3, the timer imparted with the attribute identifying information adding function is designated by numeral 23. Referring to FIG. 3 which shows the communication apparatus according to the second embodiment of the invention, numeral 4 denotes a scrambler and 5 denotes a scramble key changeover controller, wherein the scrambler 4 is comprised of a time-division frame monitoring circuit 24, a time-division frame controller 25, an application data encryption processing circuit 26 and a scramble key table manager 27. On the other hand, the scramble key changeover controller 5 is comprised of an encryption (or encipher) circuit 16, an ECM generating circuit 17, an ECM time-division frame ID/scramble key managing circuit 28 and an ECM schedule managing circuit 29. Operations of the components constituting the communication apparatus according to the second embodiment of the invention will be described below. Parenthetically, the components which serve for same functions as those shown in FIG. 2 are denoted by like reference numerals and repeated description thereof is omitted.

Referring to FIG. 3, the ECM schedule managing circuit 29, the unscrambled ECM managing circuit 22, the scramble key generating circuit 21 and the encryption circuit 16 which are included in the scramble key changeover controller 5 operate substantially in the same manner as the corresponding components of the scramble key changeover controller 2 described hereinbefore in conjunction with the first embodiment. It should, however, be noted that the function for imparting the attribute identifying information of the scramble key is not realized by the ECM time-division frame ID/scramble key managing circuit 28. Additionally, the data to be transferred to the scramble key managing table 27 includes the time-division frame ID of the ECM data, the time-division frame ID of the application data corresponding to the ECM data and the information of the scramble key itself. To this end, the ECM generating circuit 17 generates the ECM data on the basis of the information managed by the ECM time-division frame ID/scramble key managing circuit 28. The information concerning the scramble keys contained in the ECM data is changed in accordance with the information concerning the interval at which the scramble key is changed over for the updating thereof, which information is managed by the timer 23 imparted with the attribute identifying information adding function. In this conjunction, it should be mentioned that the information concerning the scramble key changeover interval is managed on a time-division frame basis for the application data. The scramble key information is enciphered by the encryption circuit 16.

In the communication apparatus according to the second embodiment now under consideration, the multiplexer 3 serves for multiplexing more than one application data such as audio, video and the like data on a time-division basis while multiplexing the time-division frames for the ECM data sent from the scramble key changeover controller 5, to thereby output the unscrambled data stream, which is then transferred is to the timer 23 imparted with the attribute identifying information adding function.

The timer 23 imparted with the attribute identifying information adding function is provided with an external input interface for receiving the information concerning the scramble key changeover interval from a external source through the input interface. The information concerning the changeover interval is managed in correspondence to the IDs of the time-division frames for the relevant application data. Further, the timer 23 imparted with the attribute identifying information adding function is designed to detect the time-division frame for the application data on the basis of the IDs of the time-division frames contained in the unscrambled data stream received from the multiplexer 3 and write the attribute identifying information of the scramble key in the application data time-division frame as detected. The attribute identifying information of the scramble keys are changed over alternately in a sequence "Even", "Odd", "Even", "Odd" or "Odd", "Even", "Odd", "Even" in accordance with the information concerning the scramble key changeover or update interval corresponding to the time-division frame ID of the application data.

Figure 15:
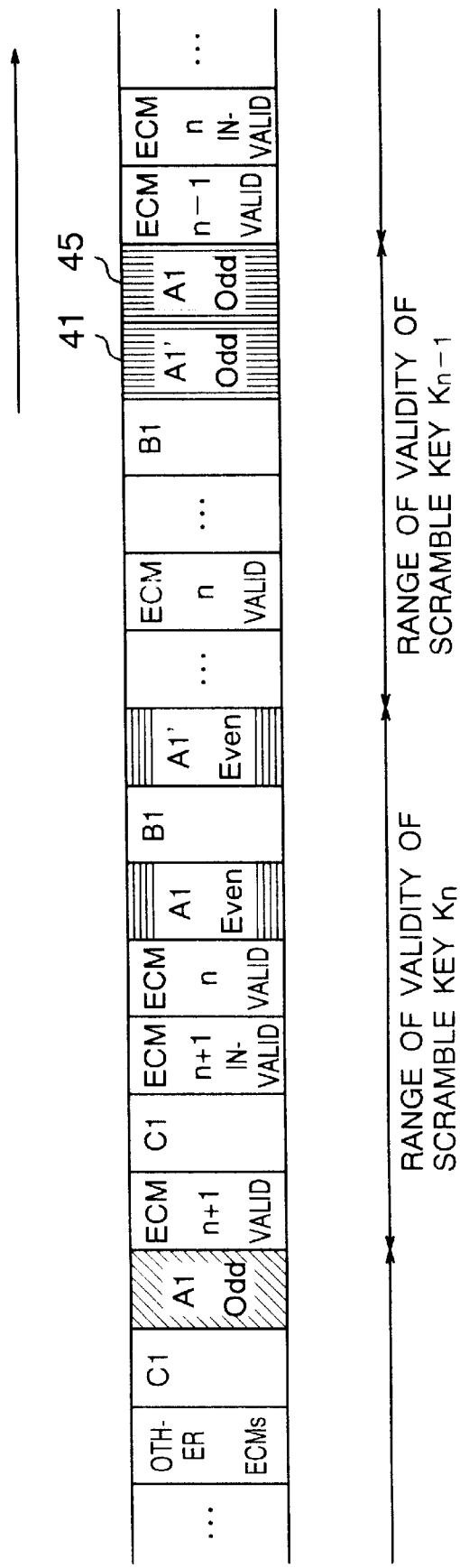
FIG. 15 is a view illustrating as exemplary structure of an encrypted data stream outputted from the scrambler according to the second embodiment of the present invention.
Figure 17:
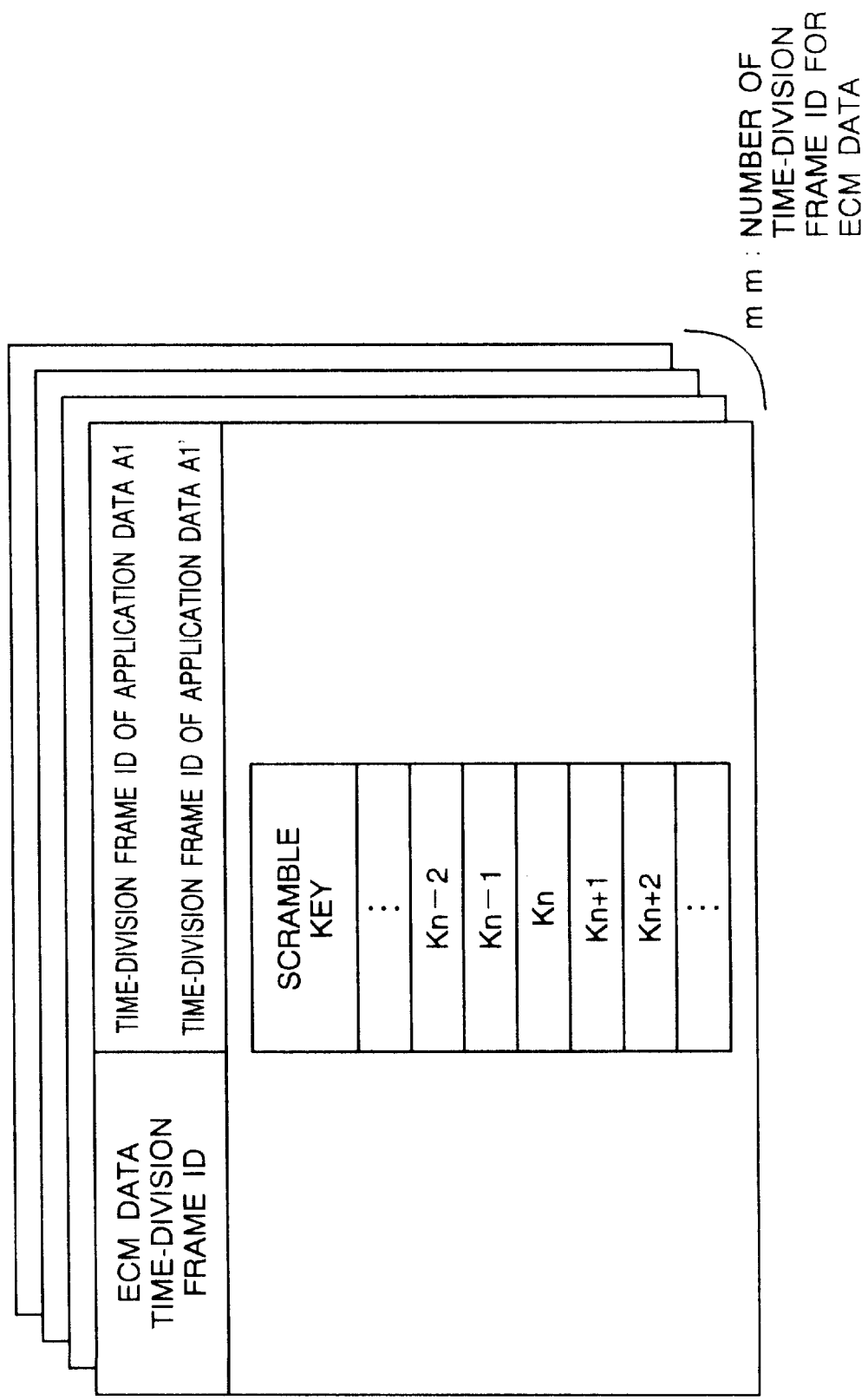
FIG. 17 is a view for illustrating imagearily a manner in which scramble key and information thereof are stored in a scramble key managing table according to the second embodiment of the invention.

Next, operation of the scrambler 4 will be described by reference to FIGS. 14 and 15 which show exemplary structures of the multiplexed data stream. In the following description, it is assumed that scrambling operation is performed on a set of application data A1 and A1'. FIG. 14 shows an exemplary structure of an unscrambled data stream inputted to the scrambler 4. In the figure, reference numeral 42 designates a time-division frame for the application data A1, numeral 43 designates a time-division frame for the application data A1', and numeral 44 designates the time-division frame for the application data A1'. The unscrambled data stream illustrated in FIG. 14 is inputted to the scrambler 4 sequentially, starting from the rightmost time-division frame as viewed in the figure. In the scrambler 4, the time-division frame monitoring circuit 24 supervises or monitors the IDs of the individual time-division frames for thereby detecting the time-division frames of the application data, whereupon the time-division frame ID and the scramble key attribute identifying information and the scramble key attribute identifying information are derived for the detected time-division frame. In the case of the unscrambled data stream illustrated in FIG. 14, the time-division frame 42 of the application data A1 is detected. At this juncture, it is assumed that the attribute identifying information contained in the time-division frame of the application data A1 detected precedently is "Even". In that case, the time-division frame controller 25 detects that the scramble key has been changed, because the scramble key attribute identifying information of the time-division frame 42 is changed over to "Odd" from the attribute identifying information "Even" detected precedently for the same set of application data. Accordingly, on the basis of the time-division frame ID of the application data, time-division frame controller 25 then acquires the scramble key from the scramble key managing table 27. FIG. 17 is a view for illustrating imagearily the state in which the scramble key information is stored in the scramble key managing table 27 in the apparatus according to the second embodiment of the invention. As can be seen in the figure, the time-division frame 37 serves to manage the scramble keys in correspondence with the sets of the time-division frame ID of the application data. The time-division frame controller 25 acquires from the scramble key managing table 27 the scramble key "Kn-1" which succeeds to the scramble key "Kn-2" used precedently, on the basis of the time-division frame ID of the application data A1, whereon the time-division frame controller 25 transfers the acquired scramble key "Kn-1" to the application data encryption processing circuit 26, which responds thereto by scrambling the time-division frame for the application data A1 by using the scramble key "Kn-1" received from the time-division frame controller 25. Subsequently, the time-division frame monitoring circuit 24 detects the time-division frame 43 for the application data A1'. According to the teaching of the invention incarnated in the instant embodiment, the application data A1' and A1 are combined in a set to which the same scramble key is applied. Accordingly, the attribute identifying information of the scramble key contained in the time-division frame 43 for the application data A1' remains as "Odd" without being changed. Consequently, the time-division frame 43 for the application data A1' undergoes the scrambling operation by using the same scramble key "Kn-1" as that used for the application data A1. The time-division frame monitoring circuit 24 continues the processing in similar manner to detect the time-division frame 44 for the application data A1'. For the time-division frame 44, it is detected that the attribute identifying information of the scramble key has been changed over to "Even". Accordingly, for the time-division frame 44 for the application data "A1", the scrambling operation is validated by changing over the scramble key to "Kn". In the encrypted data stream shown in FIG. 15, the scrambled application data is shown in mesh. For the succeeding data streams, the scramble key is changed over in accordance with the change in the attribute identifying information of the scramble key. Same holds true for the time-division frames for the other application data than "A" and "A1".

Embodiment 3

Figure 4:
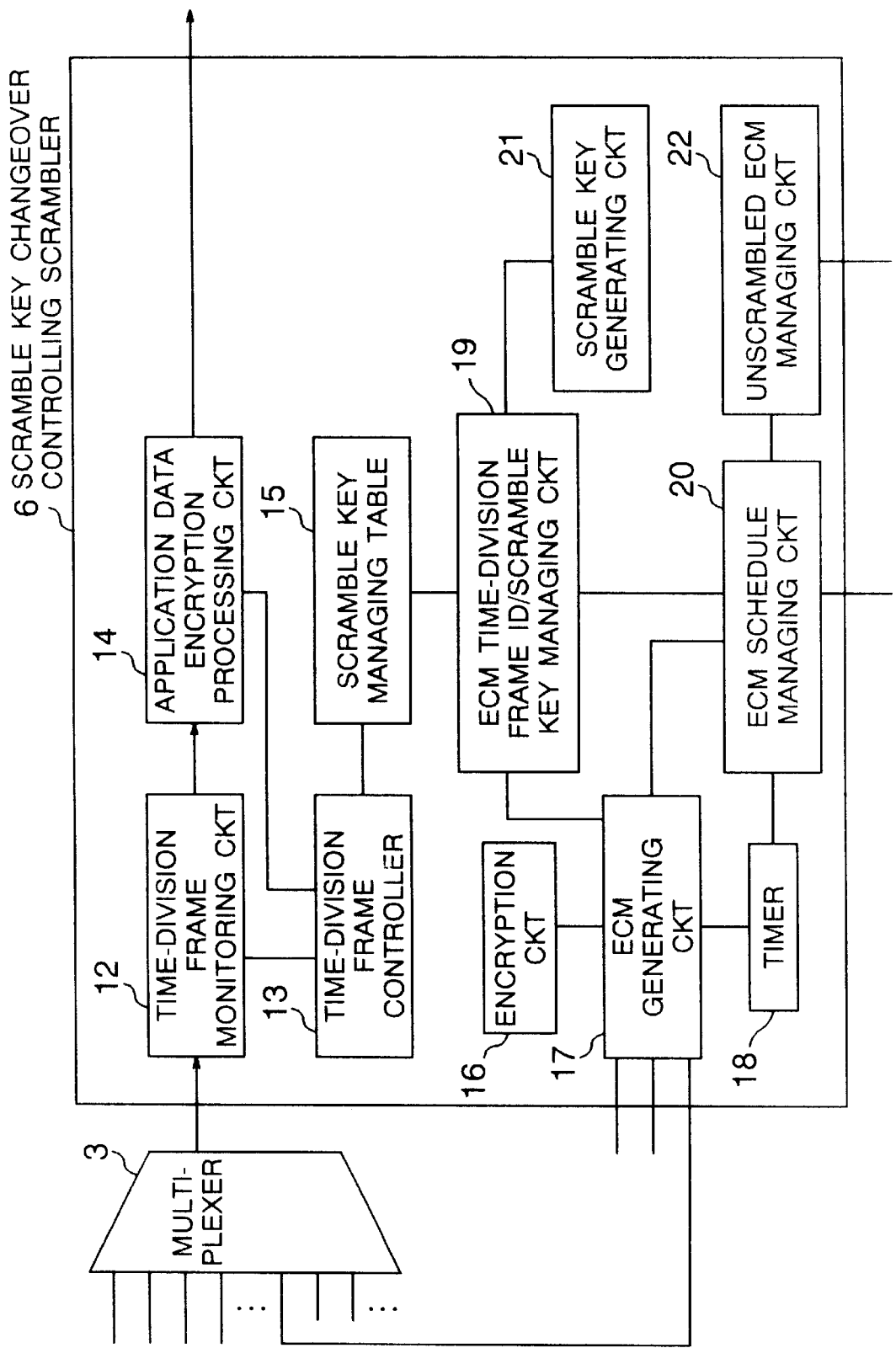
FIG. 4 is a block diagram showing in general a circuit configuration of apparatus installed at a sender side in a communication system according to yet another embodiment of the present invention.

FIG. 4 is a block diagram showing in general a circuit configuration of the apparatus or equipment installed at the sender side in the communication system according to a third embodiment of the present invention. The apparatus installed at the sender side according to the instant embodiment is comprised of a scramble key changeover controller/scrambler unit which serves for both the functions of the scrambler 1 and the scramble key changeover controller 2 described hereinbefore in conjunction with the first embodiment by reference to FIG. 2 and a multiplexer which is also implemented in a same structure as the multiplexer 3 described previously. The scramble key changeover controller/scrambler unit according to the instant embodiment is denoted by reference numeral 6 in FIG. 4. More specifically, in the case of the apparatus now under consideration, the scramble key changeover controller/scrambler unit 6 is so designated as to carry out not only all the functions performed by the scramble key changeover controller 2 in the apparatus according to the first embodiment, i.e., generation of the scramble keys, processing for establishing the correspondences between the generated scramble keys and the information inputted from a relevant external source as well as management thereof, generation of the ECM data and so forth but also all the functions which are carried out by the scrambler 1 of the sender apparatus according to the first embodiment such as supervision or monitoring of the time-division frames, detection of the information concerning the scramble keys, scrambling processing based on the detected information and others. The individual components which constitute the scramble key changeover controller/scrambler unit 6 and which serve for the essentially same functions as those described hereinbefore by reference to FIG. 2 are denoted by like reference numerals and repeated description thereof is omitted.

Embodiment 4

Figure 5:
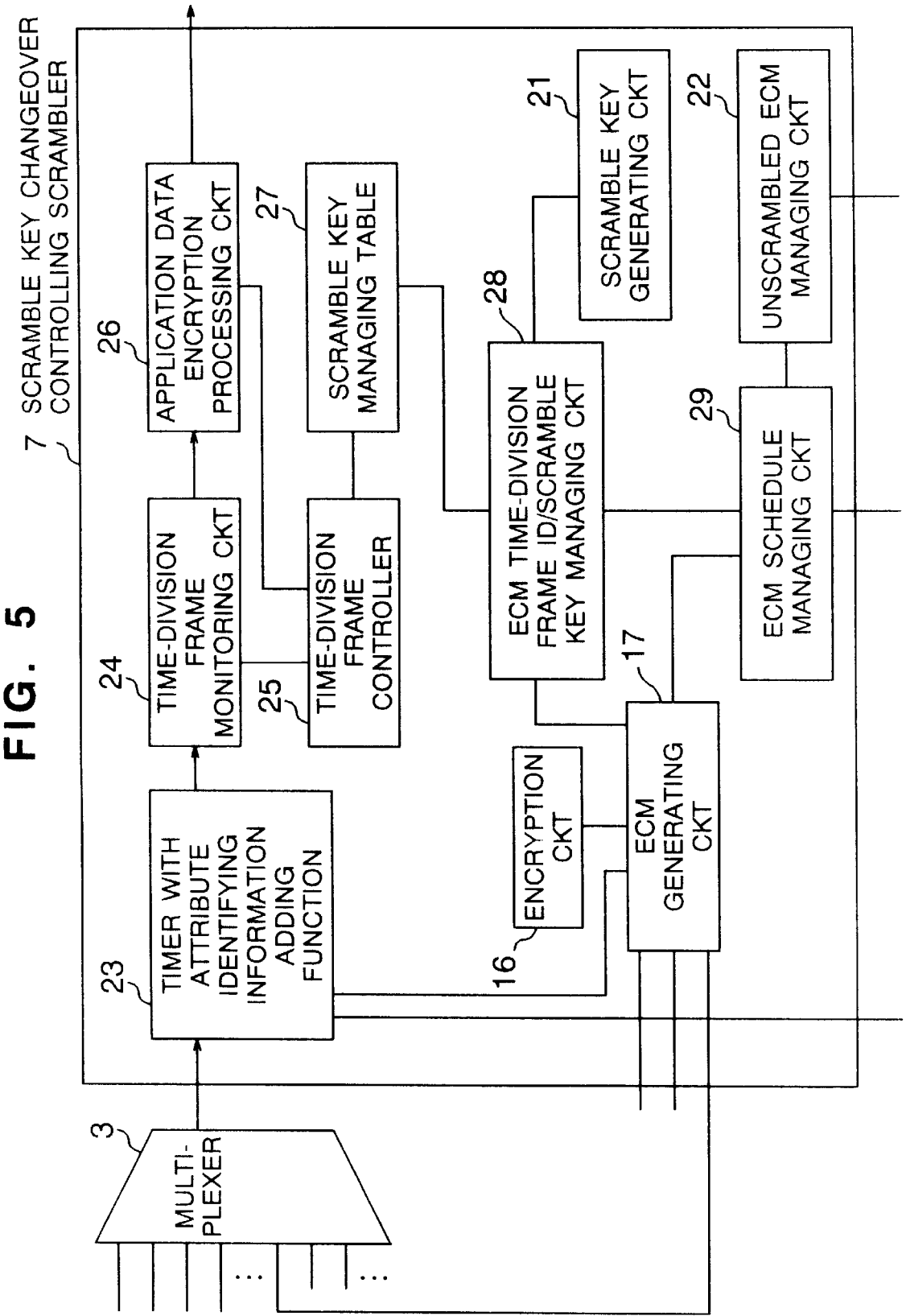
FIG. 5 is a block diagram showing in general a circuit configuration of apparatus installed at a sender side in a communication system according to still another embodiment of the present invention.

FIG. 5 is a block diagram showing a circuit configuration of the apparatus installed at the sender side in the communication system according to a fourth embodiment of the present invention. The sender apparatus according to the instant embodiment is comprised of a scramble key changeover controller/scrambler unit which serves for the function of the timer 23 imparted with the attribute identifying information adding function, the function of the scrambler 4 and the function of the scramble key changeover controller 5 described hereinbefore in conjunction with the second embodiment of the invention by reference to FIG. 3 and a multiplexer which is also implemented in a same structure as the multiplexer 3 described previously. The scramble key changeover controller/scrambler unit which incorporates the timer 23 imparted with the attribute identifying information adding function according to the instant embodiment is denoted by reference numeral 7 in FIG. 5. More specifically, in the case of the sender apparatus now under consideration, the scramble key changeover controller/scrambler unit 7 is so designated as to carry out not only the functions performed by the scramble key changeover controller 5 in the sender apparatus according to the second embodiment, i.e., generation of the scramble keys, processing for establishing the correspondences between the generated scramble keys and the information inputted from a relevant external source as well as management thereof, generation of the ECM data, and so forth but also the function carried out by the timer 23 imparted with the attribute identifying information adding function such as addition of the scramble key attribute identifying information to the time-division frame for the application data, control of the scramble key changeover interval and others as well as the functions which are carried out by the scrambler 4 such as supervision or monitoring of the time-division frames, detection of the information concerning the scramble keys, scrambling processing based on the detected information and others in the sender apparatus according to the second embodiment of the invention. The individual components which constitute the scramble key changeover controller/scrambler unit 7 incorporating the timer 23 imparted with the attribute identifying information adding function and the multiplexer and which serve for the essentially same function as those described by reference to FIG. 3 are denoted by like reference numerals and repeated description thereof is omitted.

Embodiment 5

Figure 6:
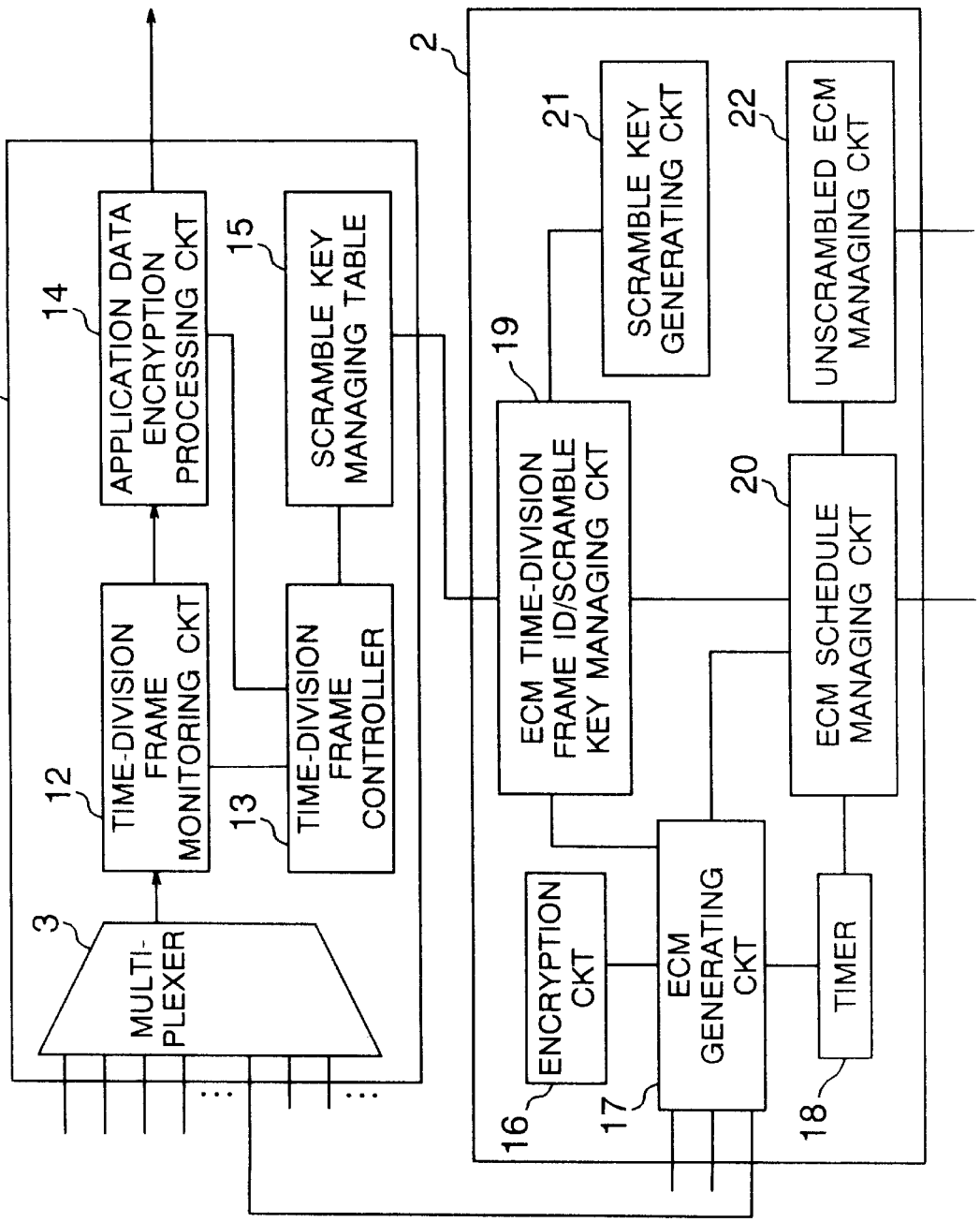
FIG. 6 is a block diagram showing in general a circuit configuration of apparatus installed at a sender side in a communication system according to a further embodiment of the present invention.

FIG. 6 is a block diagram showing a circuit configuration of a sender apparatus in the communication system according to a fifth embodiment of the invention. The sender apparatus according to the instant embodiment is comprised of a multiplexing unit which corresponds to the multiplexer 3 imparted with the functions of the scrambler 1 and a scramble key changeover controller 2 described hereinbefore in conjunction with the first embodiment by reference to FIG. 2. In FIG. 6, the multiplexing unit according to the instant embodiment is denoted by reference numeral 8. More specifically, in the case of the sender apparatus now under consideration, the multiplexing unit 8 is so implemented as to carry out not only the time-division multiplexing operation for the application data and the ECM data as performed by the multiplexer 3 in the apparatus according to the first embodiment but also operations such as supervision or monitoring of the time-division frames, detection of the information concerning the scramble keys, scrambling processing on the basis of the detected information and others as executed by the scrambler 1 in the sender apparatus according to the first embodiment of the invention (FIG. 2). The individual components which constitute the multiplexing unit 8 and the scramble key changeover controller 2 and which serve for the essentially same functions as those described hereinbefore by reference to FIG. 2 are denoted by like reference numerals and repeated description thereof is omitted.

Embodiment 6

Figure 7:
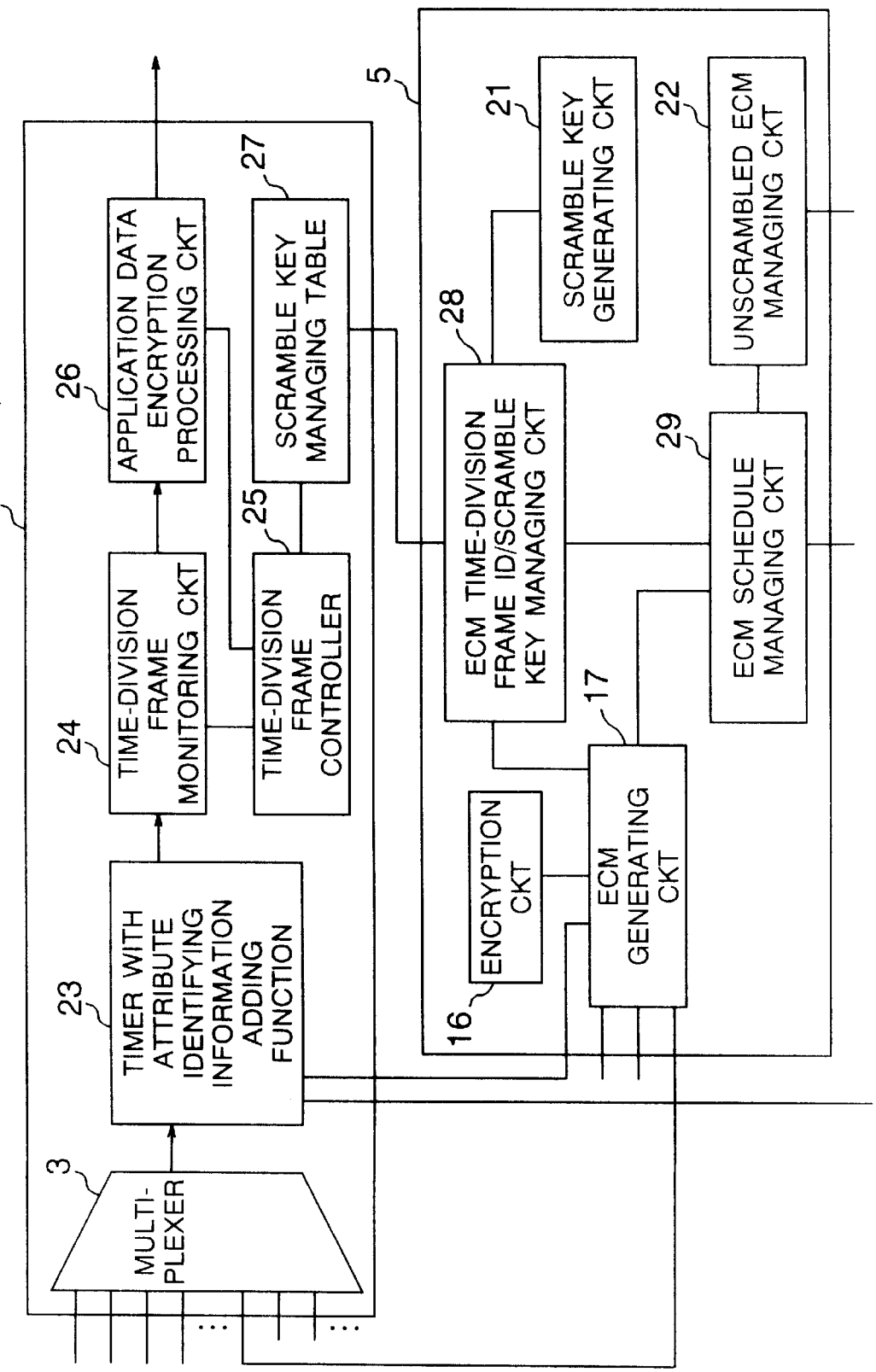
FIG. 7 is a block diagram showing in general a circuit configuration of apparatus installed at a sender side in a communication system according to still further embodiment of the present invention.

FIG. 7 is a block diagram showing a circuit configuration of a sender apparatus in the communication system according to a sixth embodiment of the invention. The sender apparatus according to the instant embodiment is comprised of a multiplexing unit which corresponds to the multiplexer 3 imparted with the function of the timer 23 having the attribute identifying information adding function and those of the scrambler 4, and a scramble key changeover controller 5 described hereinbefore in conjunction with the second embodiment by reference to FIG. 3. In FIG. 7, the multiplexing unit according to the instant embodiment is generally denoted by reference numeral 9. More specifically, in the case of the sender apparatus now under consideration, the multiplexing unit 9 is so implemented as to carry out not only the time-division multiplexing operation for the application data and the ECM data as performed by the multiplexer 3 in the apparatus according to the second embodiment but also operations such as writing of the attribute identifying information of the scramble key in the time-division frame for the application data and control of the scramble key changeover interval as performed by the timer 23 imparted with the attribute identifying information adding function of the sender apparatus according to the second embodiment as well as operation such as monitoring of the time-division frames, detection of the information concerning the changeover of the scramble keys, scrambling processing and others as executed by the scrambler of the sender apparatus according to the first and second embodiments of the invention. The individual components which constitute the multiplexing unit 9 and the scramble key changeover controller 5 and which serve for the essentially same functions as those described hereinbefore by reference to FIG. 3 are denoted by like reference numerals and repeated description thereof is omitted.

Embodiment 7

Figure 8:
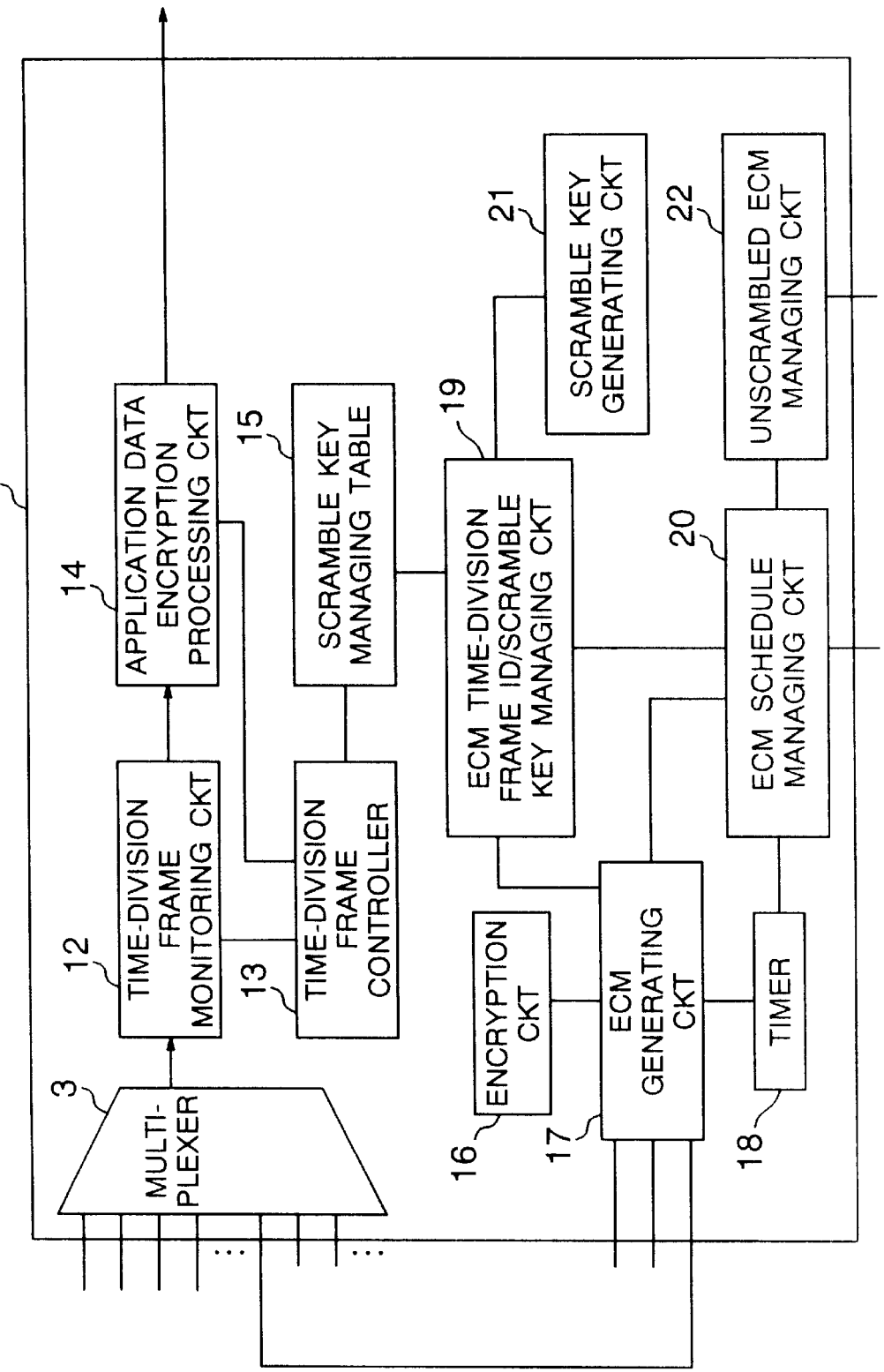
FIG. 8 is a block diagram showing in general a circuit configuration of apparatus installed at a sender side in a communication system according to yet further embodiment of the present invention.

FIG. 8 is a block diagram showing a circuit configuration of a sender apparatus according to a seventh embodiment of the invention. The sender apparatus includes a multiplexing unit which is comprised of a multiplexer 3 additionally imparted with the functions of the scrambler 1 and those of the scramble key changeover controller 2 described hereinbefore in conjunction with the first embodiment by reference to FIG. 2. In FIG. 8, the multiplexing unit having the scramble key changeover function and the scrambling function according to the instant embodiment is generally denoted by reference numeral 10. More specifically, in the case of the sender apparatus currently under consideration, the multiplexing unit 10 is so implemented as to carry out the functions of the scramble key changeover controller 2 such as generation of the scramble keys, setting of correspondence between the scramble keys as generated and the externally supplied information and management thereof, generation of the ECM data, the functions of the multiplexer 3 such as time-division multiplexing of the application data and the ECM data, and the functions of the scrambler 1 such as monitoring of the time-division frames, detection of changeover of the scramble keys and scrambling in the sender apparatus according to the first embodiment of the invention. The individual components which constitute the multiplexing unit 10 and which serve for the essentially same functions as those described hereinbefore by reference to FIG. 2 are denoted by like reference numerals and repeated description thereof is omitted.

Embodiment 8

Figure 9:
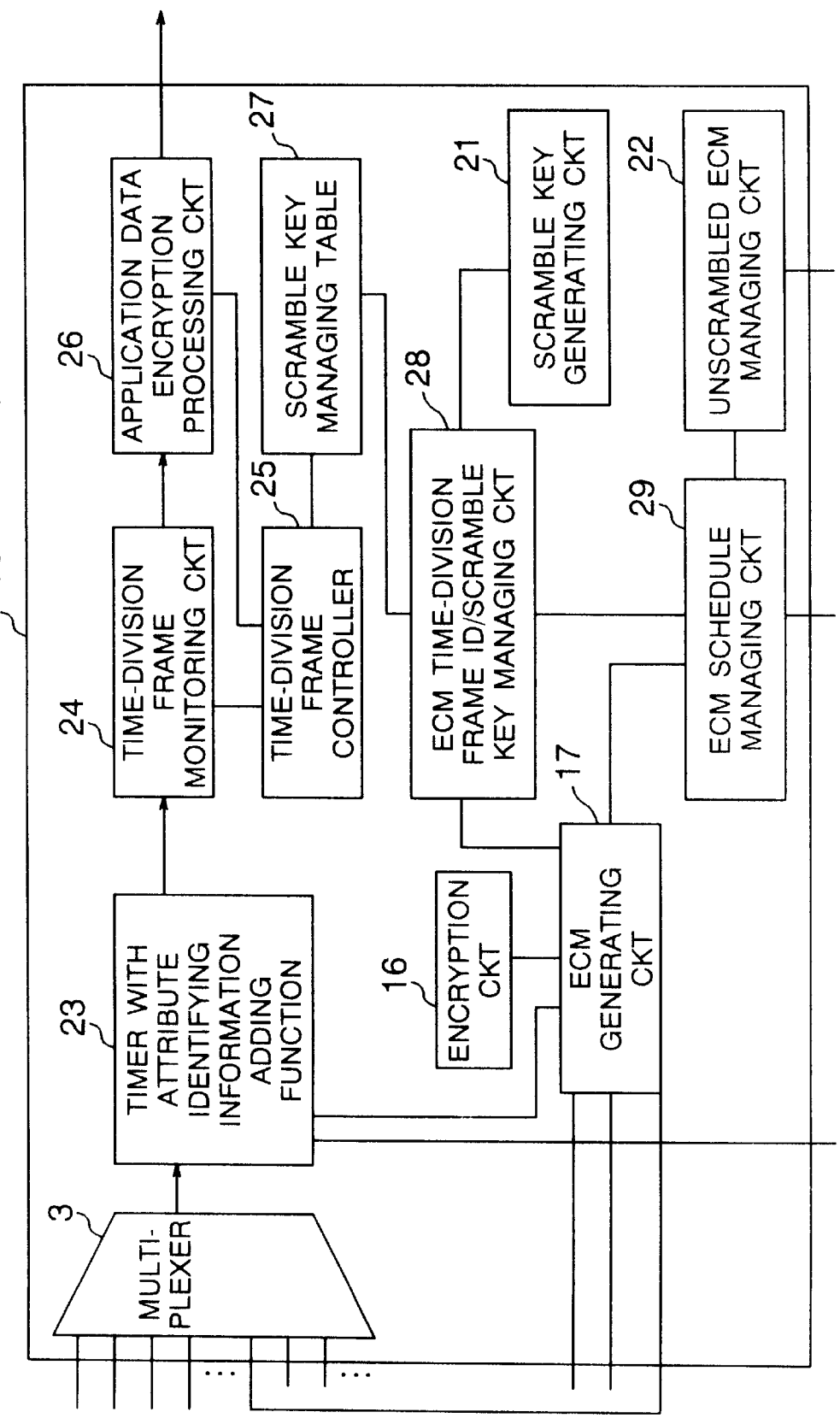
FIG. 9 is a block diagram showing a circuit configuration of a sender apparatus in a communication system according to yet another embodiment of the present invention.

FIG. 9 is a block diagram showing a circuit configuration of a sender apparatus in the communication system according to an eighth embodiment of the invention. The sender apparatus according to the instant embodiment includes a multiplexing unit which is comprised of a multiplexer 3 imparted additionally with the functions of the timer 23 having the attribute identifying information adding function, the scrambler 4 and the scramble key changeover controller 5 described hereinbefore in conjunction with the second embodiment by reference to FIG. 3. In FIG. 9, the multiplexing unit having the scramble key changeover function, the function of the timer 23 imparted with the attribute identifying information adding function and the scrambling function according to the instant embodiment is generally denoted by reference numeral 11. More specifically, in the case of the sender apparatus now under consideration the multiplexing unit 11 is so implemented as to carry out the functions of the scramble key changeover controller 5 such as generation of the scramble keys, setting of correspondence between the scramble keys as generated and the externally supplied information as well as management thereof and generation of the ECM data, the functions of the multiplexer 3 such as time-division multiplexing of the application data and the ECM data, the functions of the timer 23 imparted with the attribute identifying information adding function such as writing of the attribute identifying information of the scramble keys in the time-division frames for the application data and the control of the scramble key changeover interval, and the functions of the scrambler 4 such as monitoring of the time-division frames, detection of changeover of the scramble keys and the scrambling operation in the sender apparatus according to the second embodiment of the invention shown in FIG. 3. The individual components which constitute the multiplexing unit 11 and which serve for the essentially same functions as those described hereinbefore by reference to FIG. 3 are denoted by like reference numerals and repeated description thereof is omitted.

Embodiment 9

Figure 19:
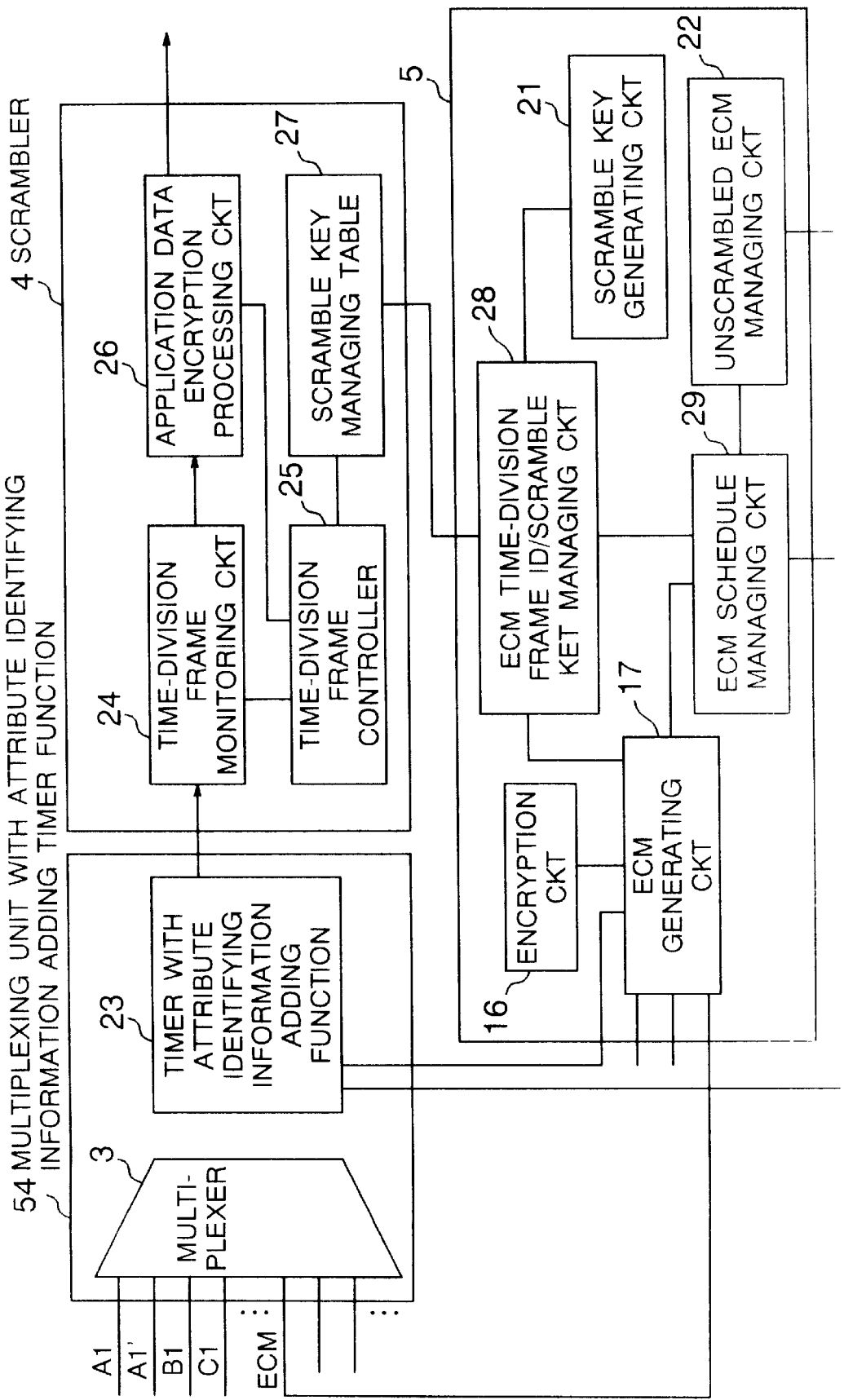
FIG. 19 is a block diagram showing a circuit configuration of a sender apparatus in the communication system according to a still further embodiment of the present invention.

FIG. 19 is a block diagram showing a circuit configuration of a sender apparatus in the communication system according to a ninth embodiment of the invention. The sender apparatus according to the instant embodiment includes a multiplexing unit which is comprised of a multiplexer imparted with the functions of the timer 23 having the attribute identifying information adding function described hereinbefore in conjunction with the second embodiment by reference to FIG. 3 in addition to the inherent function of the multiplexer 3. In FIG. 19, the multiplexing unit including the timer 23 imparted with the attribute identifying information adding function according to the instant embodiment is generally denoted by reference numeral 54. More specifically, in the sender apparatus now under consideration, the multiplexing unit 54 is so implemented as to perform the functions of the timer 23 imparted with the attribute identifying information adding function such as management or control of the scramble key changeover interval for updating the scramble key, writing of the attribute identifying information of the scramble key in the time-division frame for the relevant application data and so forth. The individual components which constitute the scrambler 4 and the scramble key changeover controller 5 and which serve for the same or equivalent functions as those described hereinbefore by reference to FIG. 3 are denoted by like reference numerals and repeated description thereof is omitted.

Modifications

In the sender apparatus according to the first, third, fifth and seventh embodiments of the present invention described by reference to FIG. 2, 4, 6 and 8, there is conceivable such cases in which the attribute identifying information of the scramble keys is not required, although it depends on the services to be presented by the communication system. In that case, the ECM time-division frame ID/scramble key managing circuit 19 of the scramble key changeover controller need not impart the attribute identifying information to the scramble key received from the scramble key generating circuit 21. Accordingly, the information sent from the ECM time-division frame ID/scramble key managing circuit 19 to the scramble key managing table 15 of the scrambler may be composed of the time-division frame ID of each ECM data, corresponding set of the time-division frame IDs of the application data, information of the scramble key and the version number. Besides, the application data encryption processing circuit 14 of the scrambler need not have the function for writing the attribute identifying information of a scramble key in the time-division frame for the application data. In that case, the time-division frame of the application data outputted from the scrambler will contain no attribute identifying information of the scramble key.

System configuration to which the Invention can be applied

Figure 18:
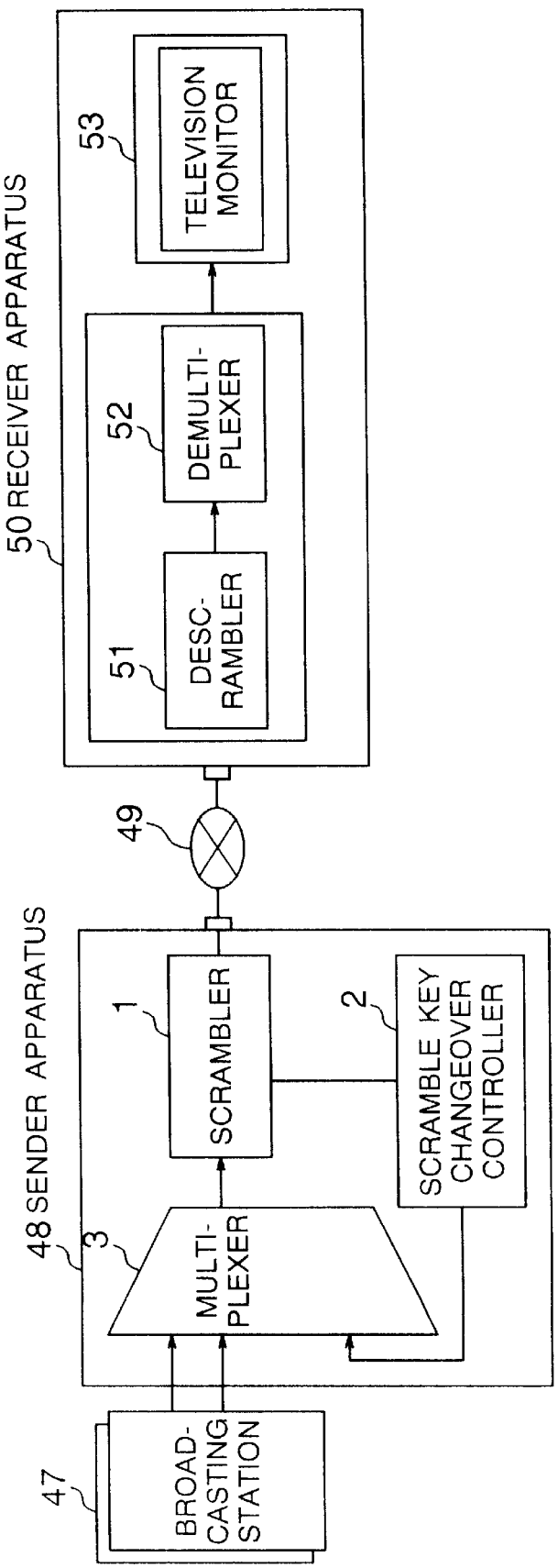
FIG. 18 is a block diagram schematically showing a communication system as a whole to which the invention can be applied.

FIG. 18 is a block diagram showing a communication system to which the invention can find application. In FIG. 18, reference numeral 47 denotes a broadcasting station, 48 denotes a sender apparatus, 49 denotes a transmission line or channel, 50 denotes a receiver apparatus, 51 denotes a descrambler, 52 denotes a demultiplexer and a numeral 53 denotes a television monitor. The sender apparatus 48 is implemented in the structure described hereinbefore in conjunction with the first embodiment of the invention and includes a multiplexer 3, a scrambler 1 and a scramble key changeover controller 2. It goes without saying that the sender apparatus may be realized in any one of the structures according to the other embodiments of the invention. Programs created at the broadcasting station 47 are available in the form of application data such as video data, audio data and/or the like. In the sender apparatus 48, these application data are multiplexed by the multiplexer 3 on a time-division basis, and then the time-division frames for the ECM data generated by the scramble key changeover controller 2 are multiplexed further, whereby unscrambled data stream is outputted. Upon reception of the unscrambled data stream, the scrambler 1 detects the information concerning the scramble keys contained in the time-division frames carried by the data stream and execute scrambling processing by using the scramble key corresponding to the information detected, as a result of which encrypted data stream is outputted for transmission, for which cable, terrestrial wave, satellite links or like medium may be used. The receiver apparatus receives the incoming encrypted data stream. In the descrambler 51, the encrypted data stream as received is released from the scrambled cr encrypted state by using the descramble key corresponding to the scramble key used in the sender. Further, the application data such as video data, audio data and/or the like is demultiplexed by the demultiplexer 52. The individual data resulting from the demulitplexing may be reproduced by an output device such as a display of the television monitor 53. In this manner, the programs created by the broadcasting station 47 can be enjoyed.

At this juncture, it should however be mentioned that the application data inputted to the multiplexer in each of the embodiments of the invention described above may be an encrypted data stream multiplexed and undergone scramble processing in other communication apparatus.

In the case of the conventional receiver apparatus known heretofore, there arises such situation in which application data received by the receiver apparatus can not get rid of the scrambled state because synchronism between the scramble key and the information concerning the scramble key as contained in the data stream undergoes disturbance at the side of the sender apparatus. To cope with this problem, some of the conventional receiver apparatuses are provided with such a descrambling function that a correct descramble key is retrieved from descramble key information available from a different route or source than the transmission line or channel instead of resorting to the scramble key information contained in the incoming multiplexed data stream. By contrast, according to the teachings of the present invention, the synchronism can be established without fail between the changeover of the scramble keys and the changeover of the scramble key information contained in the multiplexed data stream. Accordingly, it is unnecessary to provide the receiver apparatus with such extraneous function as mentioned above.

Furthermore, according to teachings of the invention incarnated in the first, second, third, fourth and ninth embodiments described hereinbefore, the sender apparatus can be equipped with the function required for realizing concealment of data transmission independent of the multiplex processing engine. Such function can be realized through cooperation of the scrambler 1 and the scramble key changeover controller 2 in the apparatus according to the first embodiment, while in the apparatus according to the second embodiment of the invention, the above function can be realized through cooperation of the timer 23 imparted with attribute identifying information adding function, the scrambler 4 and the scramble key changeover controller 5. Further, in the apparatuses according to the third and fourth embodiments, the function of concern can be realized by the scramble key changeover controller/scrambler unit 6; 7. Accordingly, concealment feature can easily be added to the existing communication system which has not required the concealment heretofore. Thus, with the invention, it is possible to implement the communication system which can enjoy high flexibility.

With the communication system and the communication method according to the present invention, the scrambler can detect change of the scramble key information from the data stream undergone the multiplexing irrespective of the processing time in the multiplexer, wherein the scrambling is performed by using the scramble key corresponding to the information of the scramble key as detected. Thus, synchronism can be established between the changeover of the scramble keys and that of the scramble key information contained in the data stream undergone the multiplexer processing. By virtue of this arrangement, the application data can be released from the scrambled state with high reliability in the receiver apparatus.

Many modifications and variations of the present invention are possible in the light of the above techniques. It is therefore to be understood that within the scope of the appended claims, the invention may be practiced otherwise than as specifically described.

What is claimed is:

1. A communication apparatus, comprising:

a multiplexer for multiplexing more than one data on a time-division basis to thereby output a multiplexed data stream in the form of a succession of time-division frames each containing information concerning an encryption key; and encrypting apparatus for encrypting said multiplexed data stream to thereby output an encrypted data stream;

said encrypting apparatus including:

a detecting circuit for monitoring said time-division frames contained in said multiplexed data stream to detect said information concerning an encryption key contained in said time-division frames; and a data encryption processing circuit for performing encryption for said time-division frames contained in said multiplexed data stream by using an encryption key corresponding to said information concerning said encryption key detected by said detecting circuit.

2. A communication apparatus according to claim 1, wherein said multiplexer includes a circuit for multiplexing time-division frames for information data on a time-division basis in addition to multiplexing of said more than one data, to thereby output a multiplexed data stream;

said time-division frame for said information data contains a version number indicating a sequence in which said encryption key is changed for updating thereof, an information indicator for indicating whether information transmitted by said time-division frame for said information data is valid or not and a time-division frame identifier;

wherein said encrypting apparatus includes:

a time-division frame monitoring circuit for receiving the multiplexed data stream output from said multiplexer to monitor the time-division frame identifiers of said time-division frames, respectively, for thereby detecting said time-division frames for said information data with the aid of said time-division frame identifier to extract said version number and said information indicator;

an encryption key managing table for managing said version number and the information of said encryption keys by establishing correspondence therebetween;

a data encryption processor for performing encryption of the time-division frames for said data; and a time-division frame controller for receiving said information indicator and said version number extracted by said time-division frame monitoring circuit to detect changeover of said encryption key when said information indicator is valid and when said version number changes consecutively from the version number received precedently, for thereby controlling said data encryption processor so that said data encryption processor performs encryption of the time-division frame for the data subject to encryption on the basis of encryption key information corresponding to said version number, said encryption key information being managed by said encryption key managing table.

3. A communication apparatus according to claim 1, wherein said time-division frame for said data contains attribute identifying information of said encryption key and a time-division frame identifier; and wherein said encrypting apparatus includes:

a time-division frame monitoring circuit for receiving the multiplexed data stream output from said multiplexer to monitor the identifiers of said time-division frames, respectively, to thereby extract the attribute identifying information of said encryption key contained in the time-division frame for the data;

an encryption key managing table for managing information of the encryption keys;

a data encryption processor for performing encryption of the time-division frames for said data; and a time-division frame controller for receiving the attribute identifying information of the encryption key extracted by said time-division frame monitoring circuit to detect changeover of said encryption key when said attribute identifying information of said encryption key differs from the attribute identifying information received precedently, for thereby controlling said data encryption processor so that said data encryption processor performs encryption of the time-division frame for the data subject to encryption on the basis of encryption key information managed by said encryption key managing table.

4. A communication method, comprising the steps of:

multiplexing more than one data on a time-division basis to thereby output a multiplexed data stream in the form of a succession of time-division frames each containing information concerning an encryption key; and encrypting said multiplexed data stream to thereby output an encrypted data stream;

wherein said encrypting step includes the substeps of:

monitoring said time-division frames contained in said multiplexed data stream;

detecting said information concerning an encryption key contained in said time-division frames; and performing encryption for said time-division frames contained in said multiplexed data stream by using an encryption key corresponding to said information concerning said encryption key detected by a detecting circuit.

5. A communication method according to claim 4, wherein said multiplexing step further includes substeps of multiplexing more than one data and multiplexing additionally time-division frame for information data containing a version number indicating a sequence in which said encryption key is changed for updating thereof, an information indicator for indicating whether information transmitted by said time-division frame for said information data is valid or not, and a time-division frame identifier to thereby output a multiplexed data stream; and wherein said encrypting step comprising the substeps of:

receiving said multiplexed data stream and monitoring the identifiers of said time-division frames;

detecting said time-division frame for said information data which the aid of said time-division frame identifier, to thereby extract said version number and said information indicator;

detecting changeover of said encryption key when said information indicator is valid and when said version number changes consecutively from the version number received precedently; and performing encryption of the time-division frame for the data subject to encryption on the basis of encryption key information corresponding to said version number.

6. A communication method according to claim 4, wherein said multiplexing step further includes substeps of adding attribute identifying information of the encryption key and a time-division frame identifier to said more than one data to thereby output a multiplexed data stream; and wherein said encrypting step comprising the substeps of:

receiving said multiplexed data stream and monitoring the identifiers of said time-division frames;

extract the attribute identifying information of said encryption key contained in the time-division frame for the data;

detecting changeover of said encryption key when said attribute identifying information of said encryption key differs from the attribute identifying information received precedently; and performing encryption of the time-division frame for the data subject lo encryption on the basis of encryption key information corresponding to said attribute identifying information.

7. A communication apparatus comprising more than one sender apparatus and more than one receiver apparatus, each of said sender apparatus including:

a multiplexer for multiplexing more than one data on a time-division basis to thereby output a multiplexed data stream in the form of a succession of time-division frames each containing information concerning an encryption key;

a detecting circuit for monitoring said time-division frames contained in said multiplexed data stream to thereby detect said information concerning an encryption key as contained in said time-division frames; and a data encryption processor for performing encryption for said time-division frames contained in said multiplexed data stream by using an encryption key corresponding to said information concerning said encryption key detected by said detecting circuit; and each of said receiver apparatus including:

decrypting apparatus for receiving the encrypted data stream sent from said sender apparatus to thereby decrypt said encrypted data stream by using a decryption key corresponding said encryption key;

a demultiplexer for receiving said decrypted data stream for thereby separating said more than one data from one another; and a display unit for displaying the demultiplexed data.

8. A communication method for transmitting more than one data by multiplexing said data on a time-division basis into a multiplexed data stream in the form of a succession of time division frames each containing information concerning an encryption key and encrypting said multiplexed data stream, comprising the steps of:

changing an encryption key in response to change in the information concerning the encryption key contained in a first one of said succession of time-division frame; and performing encryption for one or more time-division frames succeeding to said first time-division frame by using said encryption key.

9. A communication method according to claim 8, said first time-division frame containing a version number indicating a sequence in which said encryption key is changed for updating thereof and an information indicator for indicating whether information transmitted by said time-division frame is valid or not, wherein in said encryption key changing step, a consecutive change of said version number when said information indicator is valid is made use of as indicating change of the information concerning said encryption.

10. A communication method according to claim 8, said first time-division frame containing attribute identifying information, wherein in said encryption key changing step, a change of said attribute identifying information of the encryption key is made use of as indicating change of the information concerning said encryption key.

11. An encryption apparatus for multiplexing more than one data on a time-division basis to thereby output an encrypted data stream by encrypting a multiplexed data stream having time-division frames, each containing information concerning an encryption key, comprising:

a detecting circuit for monitoring said time-division frames contained in said multiplexed data stream to thereby detect information concerning an encryption key as contained in said time-division frames; and an encrypting circuit for performing encryption for said time-division frames contained in said multiplexed data stream by using an encryption key corresponding to the information concerning the encryption key detected by said detecting circuit.

12. An encryption method of multiplexing more than one data on a time-division basis for thereby outputting an encrypted data stream by encrypting a multiplexed data stream having time-division frames, each containing information concerning an encryption key, comprising the steps of:

monitoring said time-division frames contained in said multiplexed data stream and detecting said information concerning an encryption key as contained in said time-division frames; and performing encryption for said time-division frames contained in said multiplexed data stream by using an encryption key corresponding to the information concerning the detected encryption key.

* * * * *

UNITED STATES PATENT AND TRADEMARK OFFICE
CERTIFICATE OF CORRECTION

PATENT NO. : 6,069,956
DATED : 30 May 2000
INVENTOR(S) : Hiroshi KURIHARA

It is certified that error appears in the above-identified patent and that said Letters Patent is hereby corrected as shown below:

In the Title Page: Line 4 of Title: Change "CONTINUED" to --CONTAINED--.

| Column | Line | |
|--------|------|---|
| 1 | 4 | Change "CONTINUED" to --CONTAINED--. |
| 1 | 16 | Change "system" (both occurrences) to --systems--. |
| 1 | 17 | Change "system" to --systems--. |
| 1 | 18 | Change "system" (both occurrences) to --systems--. |
| 1 | 19 | Change "system" to --systems--. |
| 1 | 26 | Change "contains" to --contain--. |
| 4 | 16 | Change "as" to --an--. |
| 4 | 22 | Change "as" to --an--. |
| 6 | 39 | After "wherein" delete "a". |
| 6 | 44 | Change "key" to --keys--. |

UNITED STATES PATENT AND TRADEMARK OFFICE
CERTIFICATE OF CORRECTION

PATENT NO. : 6,069,956

DATED : 30 May 2000

INVENTOR(S) : Hiroshi KURIHARA

It is certified that error appears in the above-identified patent and that said Letters Patent is hereby corrected as shown below:

| Column | Line | |
|--------|------|---|
| 14 | 57 | After "consideration" insert --,--. |
| 16 | 29 | Change "cr" to --or--. |
| 16 | 41 | Change "undergone" to --subjected to--. |
| 17 | 20 | Change "undergone" to --subjected to--. |
| 17 | 26 | Change "undergone" to --subjected to--. |
| 19 | 25 | Change "which" to --with--. |
| 20 | 55 | Change "lo" to --to--. |
| 20 | 12 | After "corresponding" insert --to--. |
| 20 | 25 | Change "frame" to --frames--. |

Signed and Sealed this

Twenty-ninth Day of May, 2001

Attest:

NICHOLAS P. GODICI

*Attesting Officer*     *Acting Director of the United States Patent and Trademark Office*